US011347097B2

(12) United States Patent
Lee

(10) Patent No.: US 11,347,097 B2
(45) Date of Patent: May 31, 2022

(54) DISPLAY DEVICE

(71) Applicant: Samsung Display Co., Ltd., Yongin-si (KR)

(72) Inventor: Yun Seok Lee, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 280 days.

(21) Appl. No.: 16/601,423

(22) Filed: Oct. 14, 2019

(65) Prior Publication Data
US 2020/0225531 A1 Jul. 16, 2020

(30) Foreign Application Priority Data
Jan. 14, 2019 (KR) .................. 10-2019-0004762

(51) Int. Cl.
G02F 1/1368 (2006.01)
G02F 1/1335 (2006.01)
G02F 1/1362 (2006.01)
G09G 3/36 (2006.01)

(52) U.S. Cl.
CPC ...... G02F 1/133502 (2013.01); G02F 1/1368 (2013.01); G02F 1/136227 (2013.01); G02F 1/136259 (2013.01); G02F 1/136286 (2013.01); G02F 1/136218 (2021.01); G02F 1/136222 (2021.01); G02F 1/136272 (2021.01); G02F 2201/123 (2013.01); G09G 3/3677 (2013.01); G09G 3/3688 (2013.01); G09G 2310/0243 (2013.01); G09G 2310/08 (2013.01)

(58) Field of Classification Search
CPC ......... G02F 1/133502; G02F 1/136227; G02F 1/136259; G02F 1/136286; G02F 1/1368; G02F 1/136272; G02F 2201/123
See application file for complete search history.

(56) References Cited

U.S. PATENT DOCUMENTS

2004/0080700 A1  4/2004 Kang
2009/0166633 A1  7/2009 Lee et al.
(Continued)

FOREIGN PATENT DOCUMENTS

KR  2000-0066342 A  11/2000

OTHER PUBLICATIONS

Extended European Search Report for corresponding European Patent Application No. 20151290.2, dated May 25, 2020, 10 pages.

Primary Examiner — James A Dudek
(74) Attorney, Agent, or Firm — Lewis Roca Rothgerber Christie LLP

(57) ABSTRACT

A display device is provided. The display device includes a first conductor; a first insulating layer covering the first conductor; and a first semiconductor layer and a second conductor, both disposed on the first insulating layer, wherein the first conductor includes a gate line, a gate electrode connected to the gate line, and a storage line separated from the gate line, wherein the first semiconductor layer includes a channel region overlapping the gate electrode and a first antireflective pattern overlapping the storage line, and wherein the second conductor includes a data line, a source electrode at least partially disposed on the channel region and connected to the data line, and a drain electrode at least partially disposed on the channel region and separated from the source electrode.

24 Claims, 32 Drawing Sheets

(56) References Cited

U.S. PATENT DOCUMENTS

2012/0300165 A1\* 11/2012 Zhuang ................ G09G 3/3648
  349/139
2013/0033654 A1  2/2013 Kim et al.
2018/0107040 A1  4/2018 Yeh et al.

\* cited by examiner

DISPLAY DEVICE

CROSS-REFERENCE TO RELATED APPLICATION

This application claims priority to and the benefit of Korean Patent Application No. 10-2019-0004762, filed on Jan. 14, 2019, in the Korean Intellectual Property Office, the disclosure of which is incorporated herein by reference in its entirety.

BACKGROUND

1. Field

The present invention relates to a display device.

2. Description of the Related Art

The importance of a display device has increased with the development of multimedia. Accordingly, various suitable types of display devices, such as a liquid crystal display (LCD) and an organic light emitting display (OLED), have been used.

Among display devices, a liquid crystal display device, which is one of the most widely used flat panel display devices, includes two substrates including electric field generating electrodes, such as a pixel electrode and a common electrode, and a liquid crystal layer disposed therebetween. In the liquid crystal display device, a voltage is applied to the electric field generating electrodes to form an electric field in the liquid crystal layer, so that the alignment of liquid crystal molecules in the liquid crystal layer is determined, and the polarization of incident light is controlled, thereby displaying an image.

SUMMARY

An aspect of embodiments of the present invention is directed toward a display device having high resolution and having low external light reflectance while performing high-frequency driving.

However, aspects of the present invention are not restricted to the one set forth herein. The above and other aspects of the present invention will become more apparent to one of ordinary skill in the art to which the present invention pertains by referencing the detailed description of the present invention given below.

An embodiment of a display device includes a first conductor; a first insulating layer covering the first conductor; and a first semiconductor layer and a second conductor, both disposed on the first insulating layer, wherein the first conductor includes a gate line, a gate electrode connected to the gate line, and a storage line separated from the gate line, wherein the first semiconductor layer includes a channel region overlapping the gate electrode and a first antireflective pattern overlapping the storage line, and wherein the second conductor includes a data line, a source electrode at least partially disposed on the channel region and connected to the data line, and a drain electrode at least partially disposed on the channel region and separated from the source electrode.

An embodiment of a display device includes a base substrate; a first gate line and a second gate line, both disposed on the base substrate, extending in a first direction, and spaced apart from each other in a second direction crossing the first direction; a first data line and a second data line, both insulated from the first gate line and the second gate line, extending in the second direction, and spaced apart from each other in the first direction; a first switching element including a first gate electrode connected to the first gate line, a first electrode connected to the first data line, and a second electrode; a second switching element including a second gate electrode connected to the second gate line, a third electrode connected to the second data line, and a fourth electrode; a first pixel electrode connected to the second electrode of the first switching element; a second pixel electrode connected to the fourth electrode of the second switching element; a first storage line and a second storage line, both separated from the first gate line and the second gate line; and a first antireflective pattern overlapping the first storage line and the second storage line, wherein the first gate line and the second gate line are electrically connected to each other, and the first antireflective pattern includes a semiconductor material.

BRIEF DESCRIPTION OF THE DRAWINGS

The above and other aspects and features of the present invention will become more apparent by describing in more detail exemplary embodiments thereof with reference to the attached drawings, in which.

DETAILED DESCRIPTION

Figure 1:
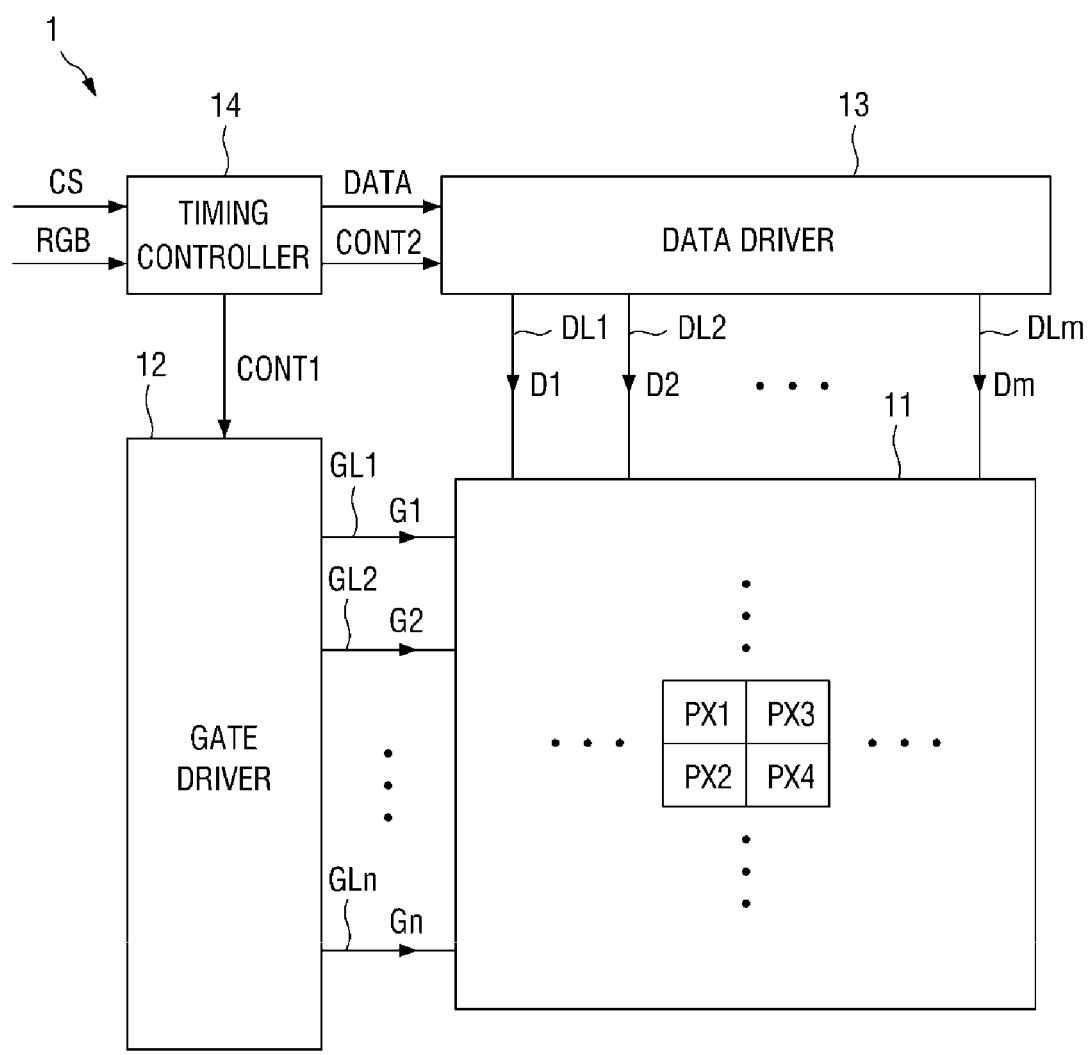
FIG. 1 is a schematic block diagram of a liquid crystal display device according to an embodiment.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

A display device according to various embodiments of the present invention may be a device for displaying a moving image or a still image, or a device for displaying a three-dimensional image, and may be used as display screens of various suitable consumer products (such as televisions, notebooks, monitors, billboards, and Internet of Things) as well as portable electronic appliances (such as mobile communication terminals, smartphones, tablets, smart watches, and navigators).

Hereinafter, embodiments of the present invention will be described in more detail with reference to the attached drawings. Also, as a display device, a liquid crystal display device will be described as an example. However, the present invention is not limited thereto, and an organic light emitting display device, a field emission display device, an electrophoretic display device, a quantum dot light emitting display device, a micro LED display device, and/or a nano LED display device may be used as the display device. The same or similar reference numerals are used for the same components in the drawings.

FIG. 1 is a schematic block diagram of a liquid crystal display device according to an embodiment.

Referring to FIG. 1, a liquid crystal display device 1 includes a display unit (pixel region or display panel) 11, a gate driver 12, a data driver 13, and a timing controller 14.

The display unit 11 is defined as a region or area for displaying an image. The display unit 11 may include a plurality of pixel units (pixels) including first to fourth pixel units PX1 to PX4. Each of the plurality of pixel units may be electrically connected to one of first to n-th gate lines (GL1 to GLn, n being a natural number of 2 or more) and one of first to m-th data lines (DL1 to DLm, m being a natural number of 2 or more). Each of the gate lines GL1 to GLn and each of the data lines DL1 to DLm may be insulated in the display unit 11.

Here, the first to n-th gate lines GL1 to GLn may extend in a first direction dr1. Further, the first to m-th data lines DL1 to DLm may extend in a second direction dr2. As used herein, for convenience of explanation, the horizontal direction in the drawings is defined as a first direction dr1, and the direction intersecting the first direction dr1 is defined as a second direction dr2. One side in the first direction dr1 refers to the right side in the drawings with respect to a virtual point of a straight line extending in the first direction dr1, and the other side in the first direction dr1 refers to the left side in the drawings with respect to a virtual point of a straight line extending in the first direction dr1. One side in the second direction dr2 refers to the lower side in the drawings with respect to a virtual point of a straight line extending in the second direction dr2, and the other side in the second direction dr2 refers to the upper side in the drawings with respect to a virtual point of a straight line extending in the second direction dr2. However, embodiments are not limited to the aforementioned directions, and it should be understood that the first direction dr1 and the second direction dr2 refer to a relative direction crossing each other.

Also, among the first to n-th gate lines GL1 to GLn, two adjacent gate lines may be directly connected to each other. For example, the first gate line GL1 is directly connected to the second gate line GL2, and the third gate line is directly connected to the fourth gate line, but the second gate line GL2 may not be directly connected to the third gate line. In an embodiment, two adjacent gate lines may be directly connected to each other outside the display unit 11, but the present invention is not limited thereto. Details thereof will be described with reference to FIG. 2.

The gate driver 12 may generate first to n-th gate signals G1 to Gn based on a first control signal CONT1 provided from the timing controller 14. The gate driver 12 may provide the generated first to n-th gate signals G1 to Gn to the plurality of pixel units arranged in the display unit 11 through the first to the n-th gate lines GL1 to GLn. The gate driver 12 may be formed of a plurality of switching elements in an embodiment, or may be an integrated circuit in another embodiment.

The data driver 13 may receive a second control signal CONT2 and image data DATA from the timing controller 14. The data driver 13 may generate first to m-th data signals D1 to Dm based on the second control signal CONT2 and the image data DATA. The data driver 13 may provide the generated first to m-th data signals D1 to Dm to the plurality of pixel units (e.g., pixel units or pixels PX1, PX2, PX3, and PX4) arranged in the display unit 11 through the first to m-th data lines DL1 to DLm. In an embodiment, the data driver 13 may include a shift register, a latch, and a digital-analog converter.

The timing controller 14 may receive an image signal RGB and a control signal CS from the outside. The timing controller 14 may process the image signal RGB and the control signal CS in accordance with the operation conditions of the display unit 11 to generate the image data DATA, the first control signal CONT1, and the second control signal CONT2. In an embodiment, the timing controller 14 may generate the first control signal CONT1 and the second control signal CONT2 that are suitable for a set or predetermined frequency (for example, 30 Hz to 150 Hz) driving method.

The image signal RGB may include a plurality of gradation data to be provided to the display unit 11. In an embodiment, the control signal CS may include a horizontal synchronization signal, a vertical synchronization signal, and a main clock signal. The horizontal synchronization signal indicates the time taken to display one line of the display unit 11. The vertical synchronization signal indicates the time taken to display an image of one frame. The main clock signal is a signal that is used as a reference for generating various suitable signals when the timing controller 14 is synchronized with each of the gate driver 12 and the data driver 13.

Hereinafter, the plurality of pixel units arranged in the display unit 11 will be described in more detail with reference to the first to fourth pixel units PX1 to PX4.

Figure 2:
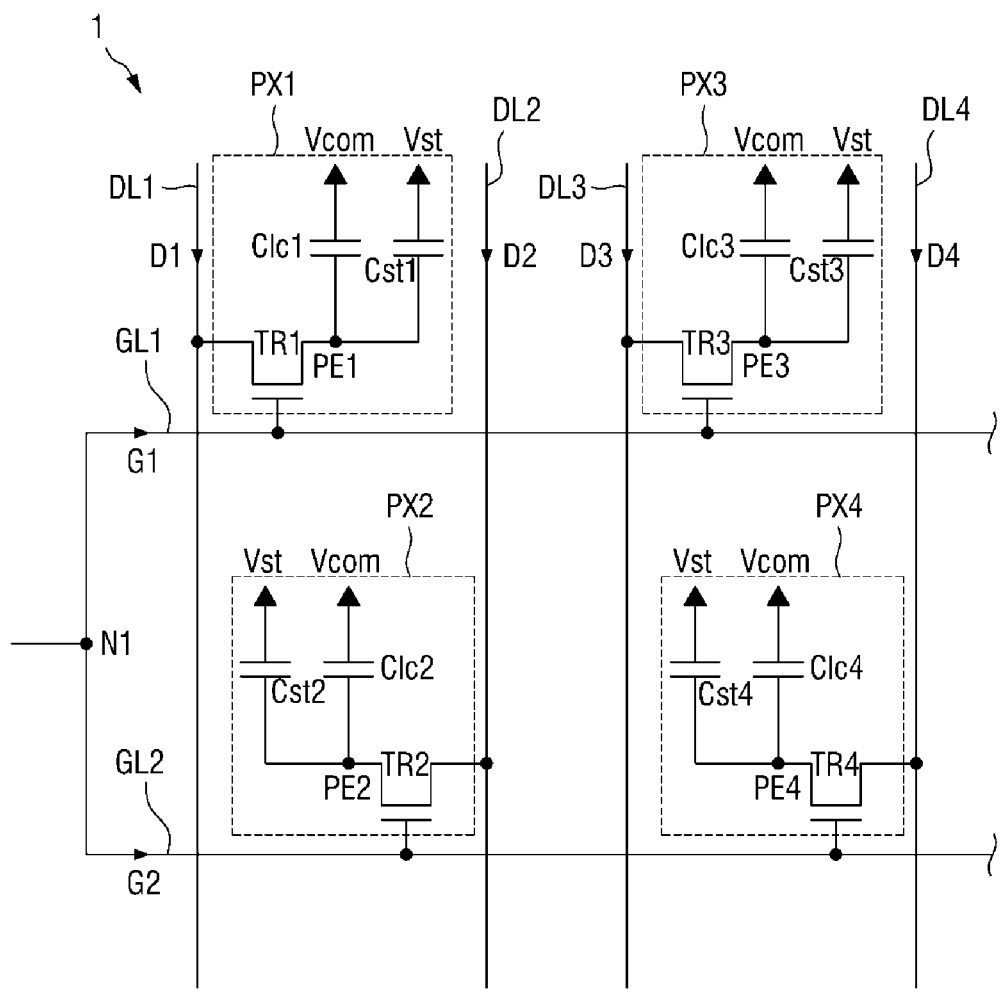
FIG. 2 is an equivalent circuit diagram of first to fourth pixel units shown in FIG. 1.
Figure 2:
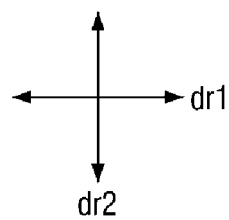
Figure 3:
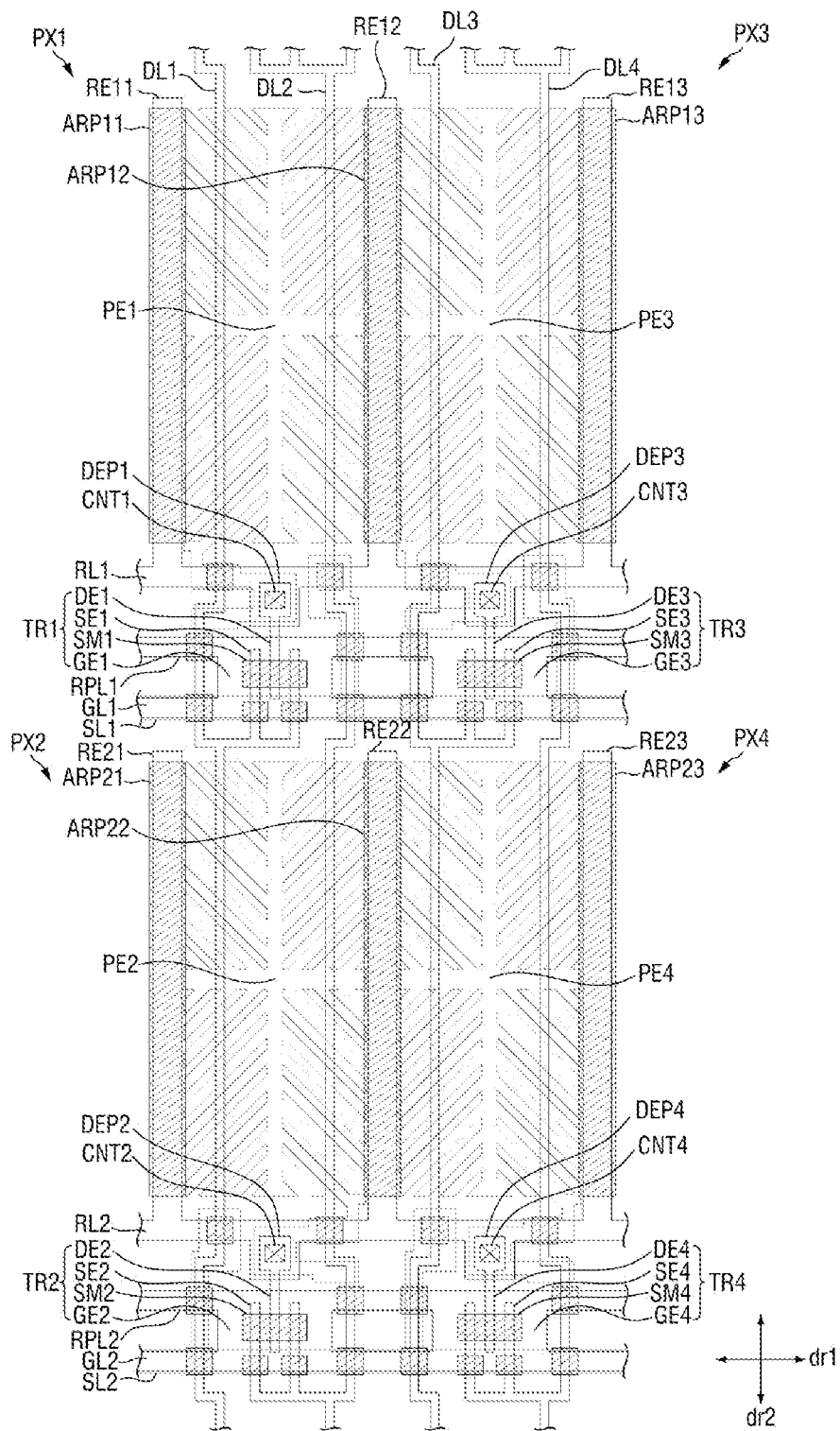
FIG. 3 is a layout view of the first to fourth pixel units shown in FIG. 1.

FIG. 2 is an equivalent circuit diagram of the first to fourth pixel units shown in FIG. 1. FIG. 3 is a layout view of the first to fourth pixel units shown in FIG. 1.

Referring to FIGS. 2 and 3, the first pixel unit PX1 and the second pixel unit PX2 may be disposed adjacent to each other along the second direction dr2. The third pixel unit PX3 and the fourth pixel unit PX4 may be disposed adjacent to each other along the second direction dr2. The first pixel unit PX1 and the third pixel unit PX3 may be disposed adjacent to each other along the first direction dr1. The second pixel unit PX2 and the fourth pixel unit PX4 may be disposed adjacent to each other along the first direction dr1.

The first to fourth pixel units PX1 to PX4 may receive different data signals D1 to D4 from different data lines, that is, the first to fourth data lines DL1 to DL4, respectively.

The liquid crystal display device 1 may include a first pixel row including the first pixel unit PX1 and the third pixel unit PX3 and extending in the first direction dr1, and a second pixel row disposed adjacent to the first pixel row, including the second pixel unit PX2 and the fourth pixel unit PX4 and extending in the first direction dr1. Meanwhile, the pixel units arranged in the same row may receive gate signals from the same gate line. For example, the first pixel row may receive the first gate signal G1 from the first gate line GL1, and the second pixel row may receive the second gate signal G2 from the second gate line GL2.

Here, the first gate line GL1 and the second gate line GL2 are directly and/or electrically connected to each other through a first node N1. That is, the first gate signal G1 received from the first gate line GL1 and the second gate signal G2 received from the second gate line GL2 may be the same signal. The position of the first node N1 is not particularly limited, and, in an embodiment, the first node N1 may be located outside the display unit 11 (that is, a non-display area where no image is displayed). Meanwhile, the first gate line GL1 and the second gate line GL2 are not connected only to the first node N1. That is, the number of nodes at which the first gate line GL1 and the second gate line GL2 are connected to each other may be plural.

The first to fourth pixel units PX1 to PX4 may include switching elements TR1 to TR4, pixel electrodes PE1 to PE4, liquid crystal capacitors Clc1 to Clc4, and storage capacitors Cst1 to Cst4, respectively. Details thereof will be described in more detail with reference to the first pixel unit PX1.

The first pixel unit PX1 may include a first switching element TR1, a first pixel electrode PE1, a first liquid crystal capacitor CM, and a first storage capacitor Cst1.

In an embodiment, the first switching element TR1 may be a thin film transistor (TFT) having an input electrode, an output electrode, and a control electrode. Hereinafter, the input electrode will be referred to as a source electrode, the output electrode will be referred to as a drain electrode, and the control electrode will be referred to as a gate electrode.

The first switching element TR1 may include a first gate electrode GE1 electrically connected to the first gate line GL1, a first source electrode SE1 electrically connected to the first data line DL1, and a first drain electrode DE1 electrically connected to the pixel electrode PE1. Here, the first drain electrode DE1 of the first switching element TR1 may be electrically connected to the first pixel electrode PE1 through a first contact hole CNT1. In an embodiment, the first contact hole CNT may be located at an equal distance from the first data line DL1 and from the second data line DL2. The first switching element TR1 may perform a switching operation based on the first gate signal G1 received from the first gate line GL1 to provide the first data signal D1 received from the first data line DL1 to the first pixel electrode PE1.

The first liquid crystal capacitor Clc1 is formed between the first pixel electrode PE1 and a common electrode (refer to "340" in FIG. 9) to which a common voltage Vcom is provided. The first storage capacitor Cst1 is formed between the first pixel electrode PE1 and a first storage line RL1 to which a storage voltage Vcst is provided. The shape of the first pixel electrode PE1 and the relationship with other structures will be described later in more detail.

The first switching element TR1 performs a switching operation based on the first gate signal G1. The second switching element TR2 performs a switching operation based on the second gate signal G2. However, as described above, the first gate line GL1 and the second gate line GL2 are connected to each other. That is, the first gate signal G1 and the second gate signal G2 are substantially the same signal.

Accordingly, the first switching element TR1 and the second switching element TR2 perform the same switching operation. However, since the first switching element TR1 is electrically connected to the first data line DL1 while the second switching element TR2 is electrically connected to the second data line DL2, different data signals may be provided to the first pixel electrode PE1 and the second pixel electrode PE2, respectively. That is, the first pixel electrode PE1 and the second pixel electrode PE2 may receive different data signals at the same time or substantially the same time. Thus, the liquid crystal display device 1 according to an embodiment of the present invention can be applied to high-resolution products and ultrahigh-resolution products requiring high-frequency driving. Here, the product requiring high-frequency driving refers to, for example, a liquid crystal display device having a driving frequency of 120 Hz or higher. Further, the high-resolution product refers to a product having a resolution of 4K (UHD) or higher, and the ultrahigh-resolution product refers to a product having a resolution of 8K (UHD) or higher.

Next, the arrangement relationship of components of the liquid crystal display device 1 according to an embodiment of the present invention will be described with reference to FIGS. 3 to 10. For convenience of explanation, a description will be made with reference to the first pixel unit PX1. It is obvious that the description of the first pixel unit PX1 may be applied to the second to fourth pixel units PX2 to PX4.

Figure 4:
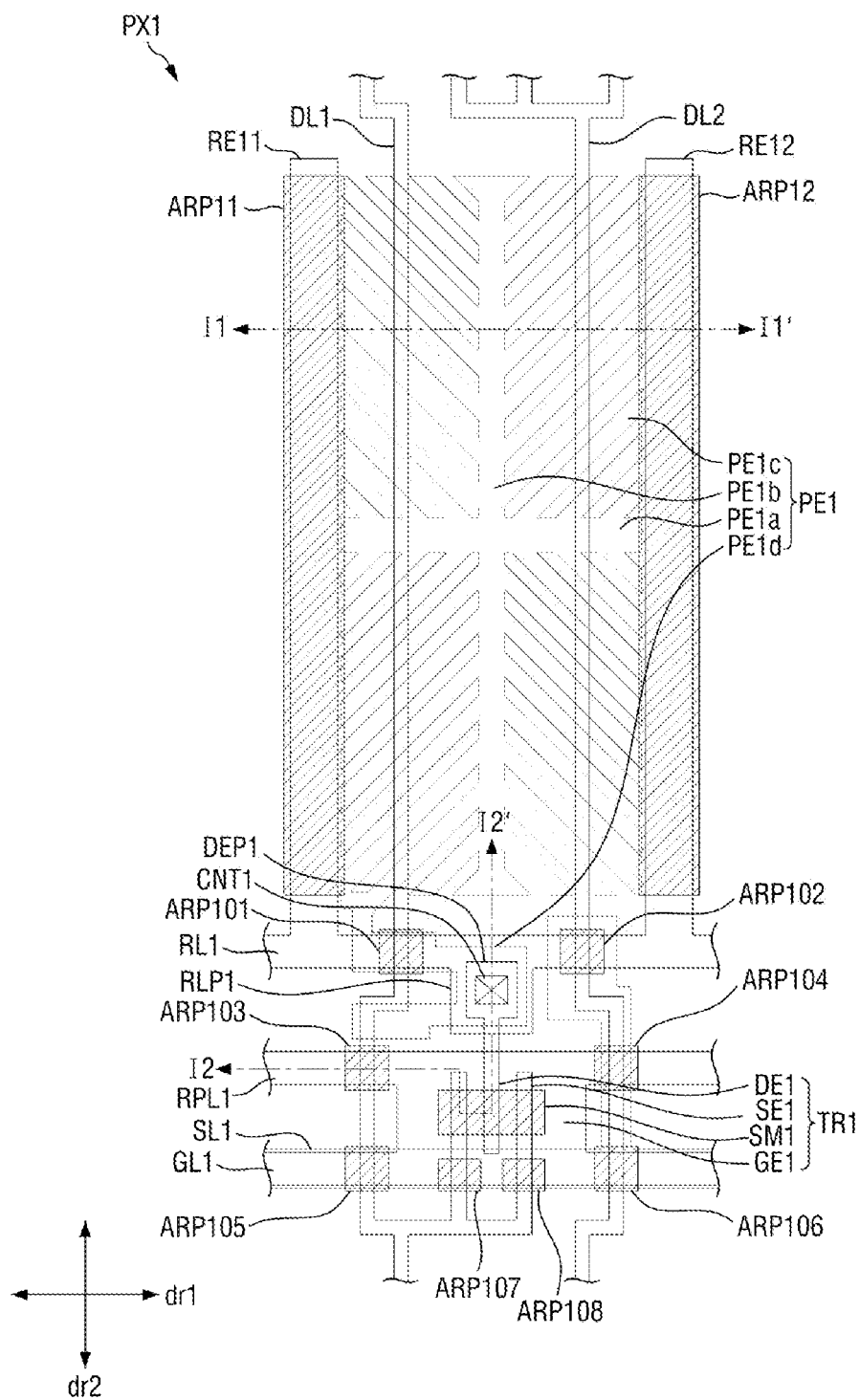
FIG. 4 is a detailed view of the first pixel unit shown in FIG. 3.
Figure 5:
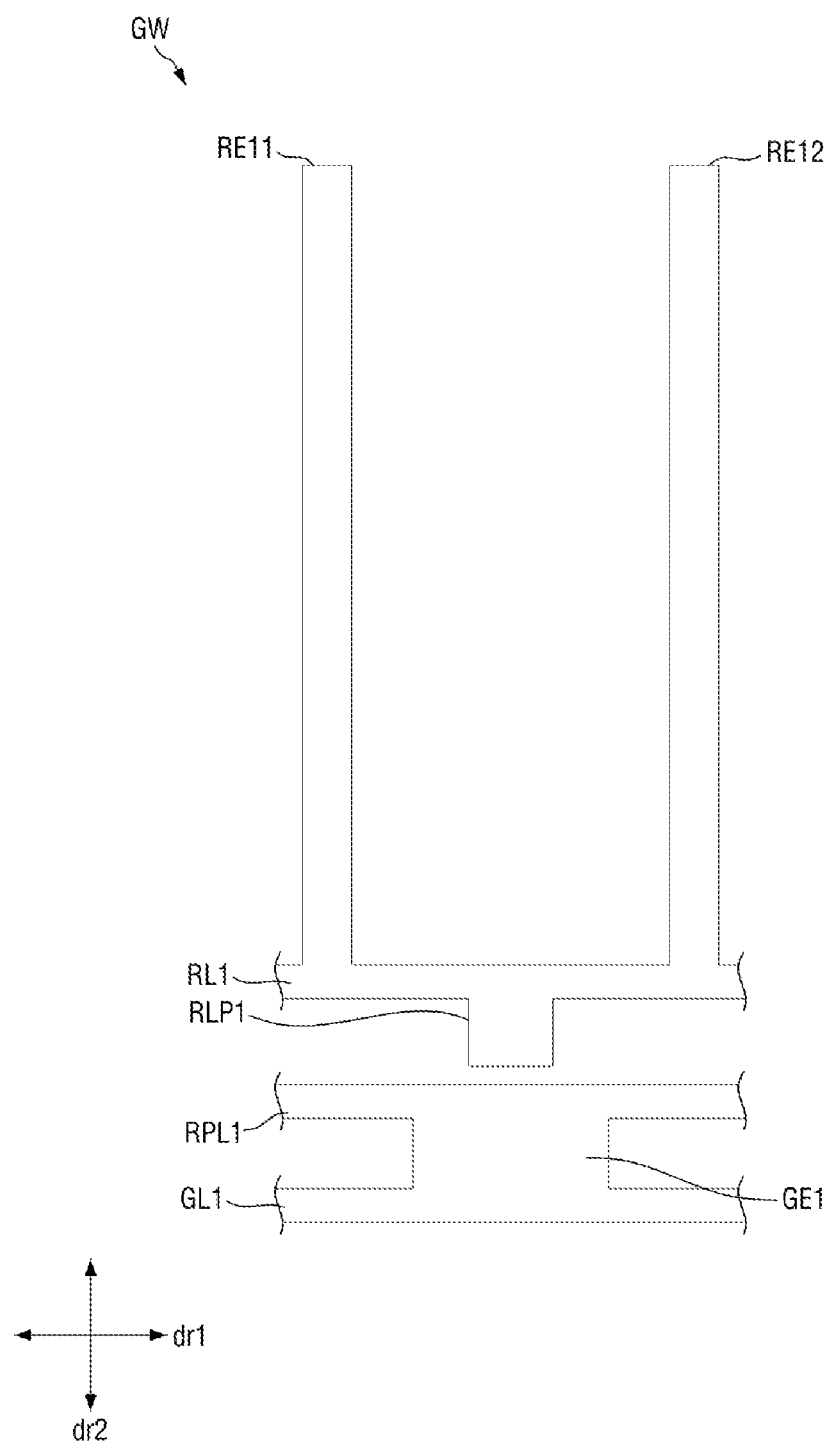
FIG. 5 is a view showing a gate conductor included in the first pixel unit shown in FIG. 4.
Figure 6:
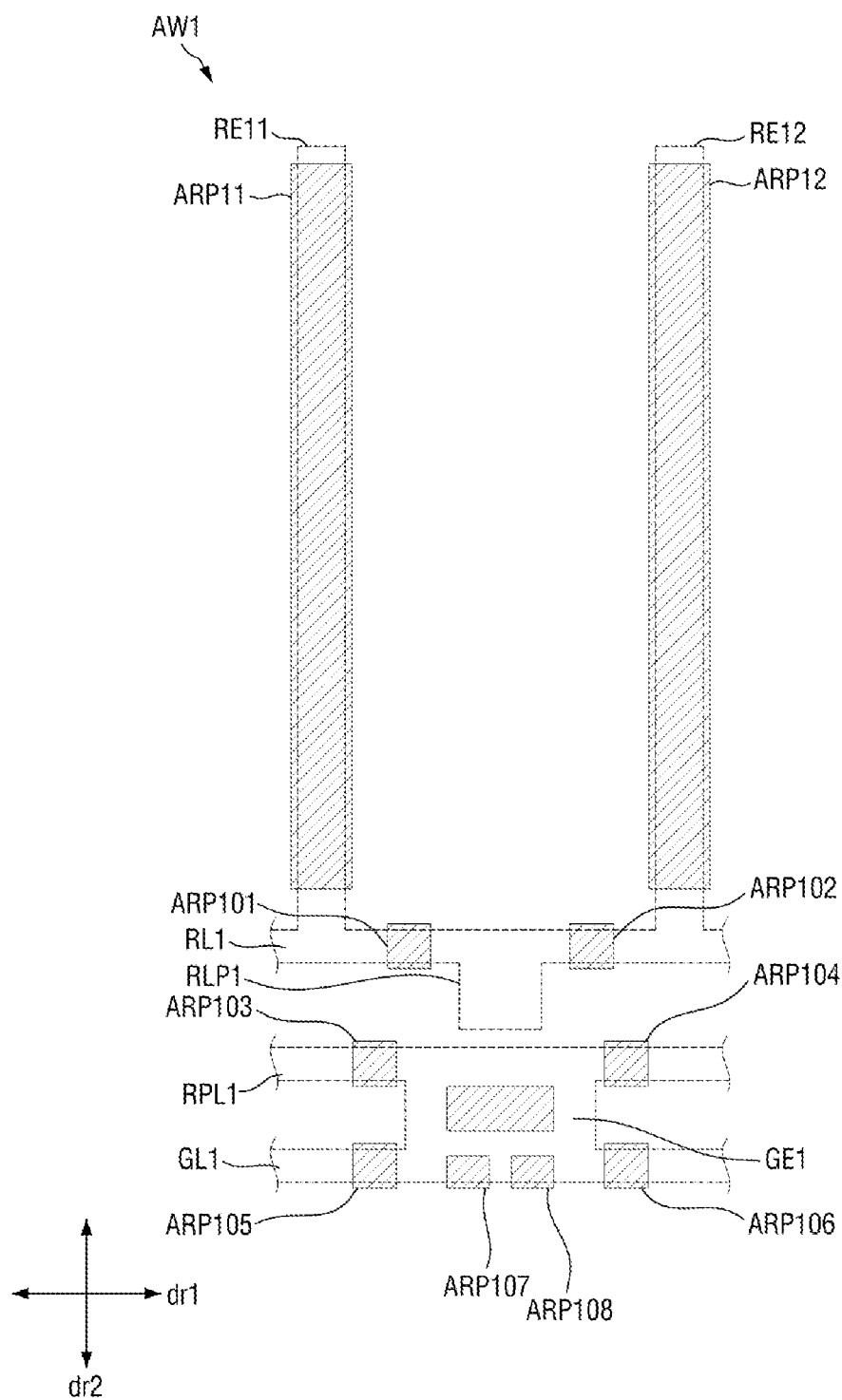
FIG. 6 is a view showing a first semiconductor layer included in the first pixel unit shown in FIG. 4.
Figure 7:
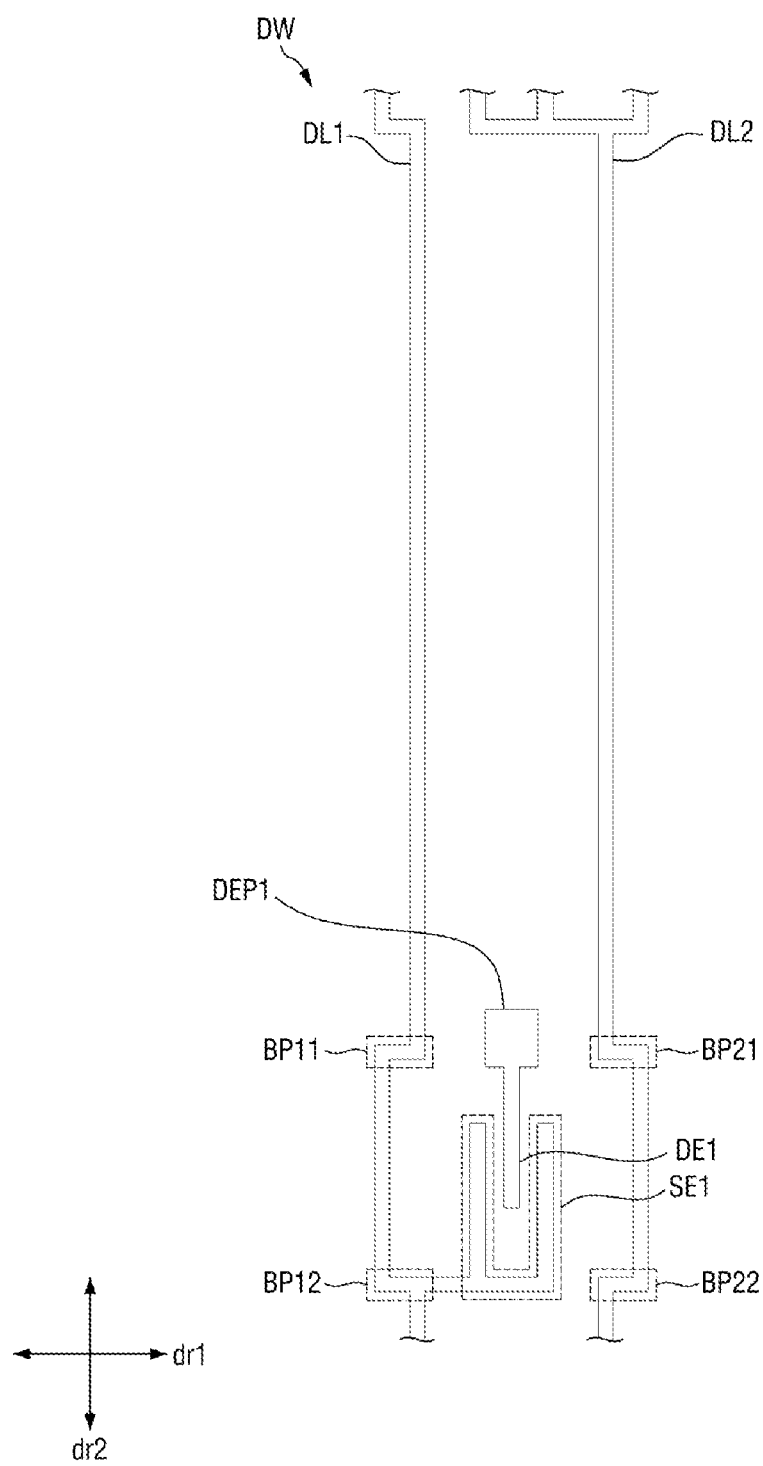
FIG. 7 is a view showing a data conductor included in the first pixel unit shown in FIG. 4.
Figure 8:
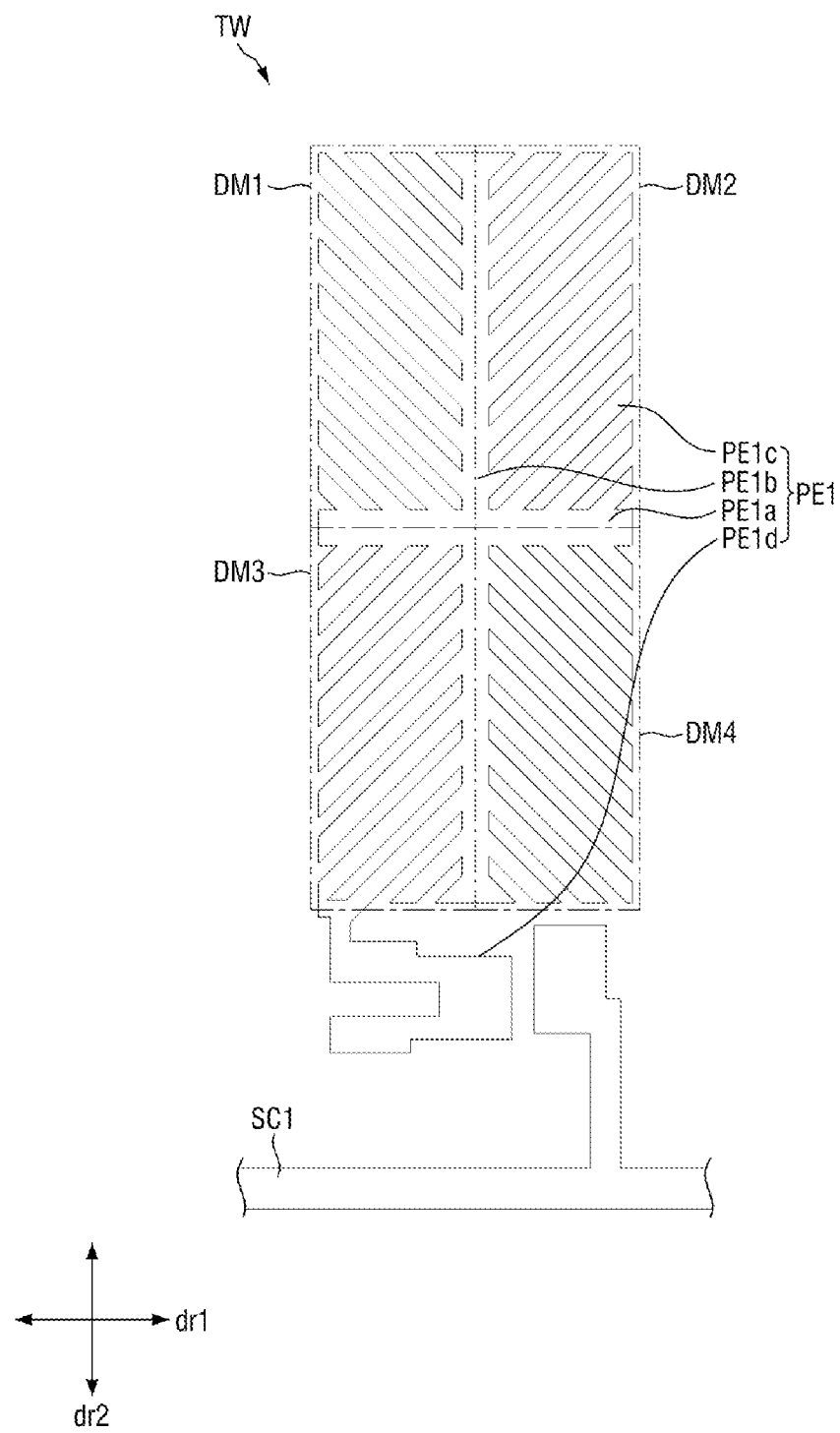
FIG. 8 is a view showing a transparent conductor included in the first pixel unit shown in FIG. 4.
Figure 9:
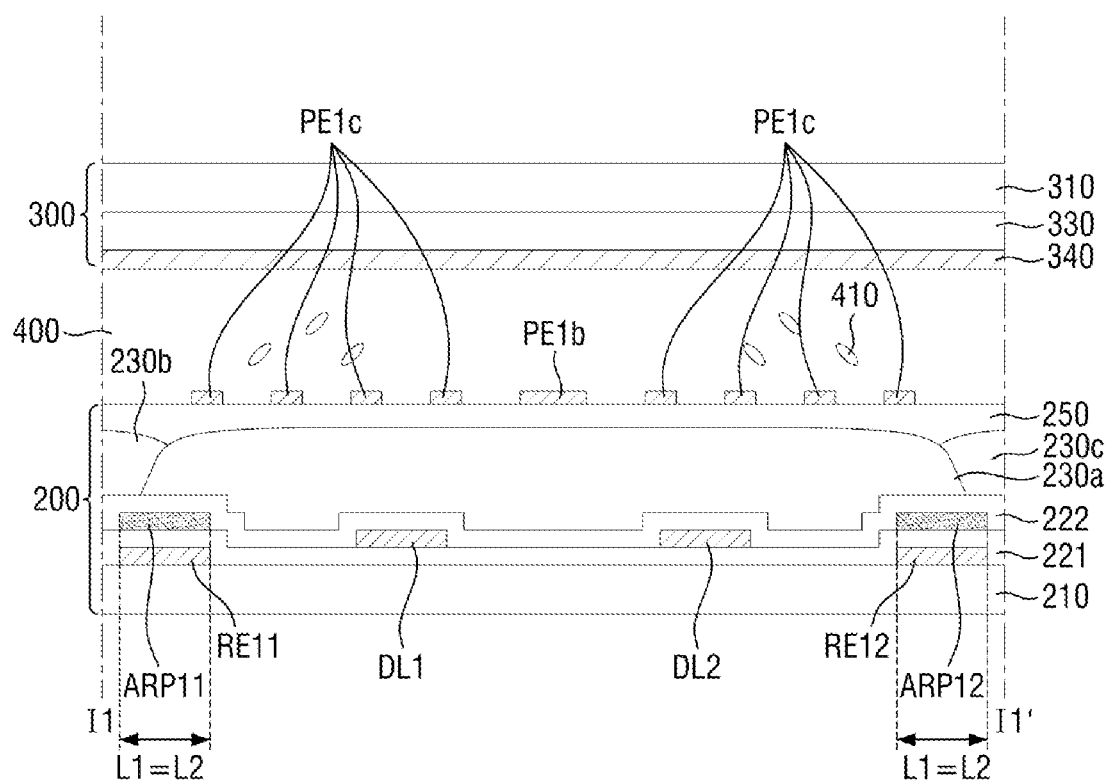
FIG. 9 is a cross-sectional view of a liquid crystal display device taken along the line I1-I1' of FIG. 4.
Figure 10:
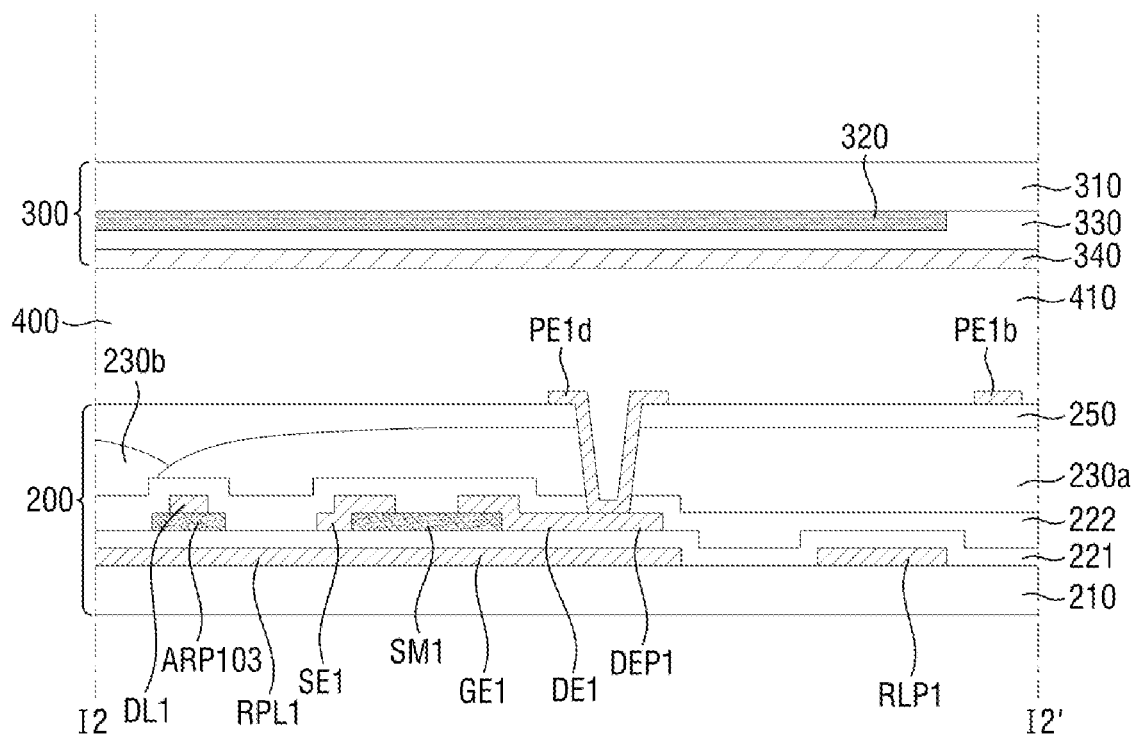
FIG. 10 is a cross-sectional view of a liquid crystal display device taken along the line I2-I2' of FIG. 4.

FIG. 4 is a detailed view of the first pixel unit shown in FIG. 3. FIG. 5 is a view showing a gate conductor included in the first pixel unit shown in FIG. 4. FIG. 6 is a view showing a first semiconductor layer included in the first pixel unit shown in FIG. 4. FIG. 7 is a view showing a data conductor included in the first pixel unit shown in FIG. 4. FIG. 8 is a view showing a transparent conductor included in the first pixel unit shown in FIG. 4. FIG. 9 is a cross-sectional view of a liquid crystal display device taken along the line I1-I1' of FIG. 4. FIG. 10 is a cross-sectional view of a liquid crystal display device taken along the line I2-I2' of FIG. 4. In order to clarify the arrangement relationship between components, the gate conductor is indicated by a dotted line, and the first semiconductor layer is indicated by a solid line.

A first display panel 200 and a second display panel 300 are disposed to face each other. A liquid crystal layer 400 is interposed between the first display panel 200 and the second display panel 300. The liquid crystal layer 400 may include a plurality of liquid crystal molecules 410. In an embodiment, the first display panel 200 may be attached to the second display panel 300 through sealing.

The first display panel 200 will be described.

In an embodiment, a base substrate 210 may be a transparent insulating substrate. Here, the transparent insulating substrate may include a glass material, a quartz material, and/or a transparent plastic material. In another embodiment, the base substrate 210 may be a flexible substrate, or may have a laminate structure of a plurality of films.

A gate conductor GW may be disposed on the base substrate 210. The gate conductor GW may include a plurality of gate lines including a first gate line GL1, a plurality of gate electrodes including a first gate electrode GE1, a plurality of storage lines including a first storage line RL1, a plurality of storage line protrusions including a first storage line protrusion RLP1, and a plurality of storage electrodes including a first storage electrode pattern RE11 and a second storage electrode pattern RE12. In an embodiment, the gate conductor GW may further include a plurality of repair lines including a first repair line RPL1.

The first gate line GL1 extends along the first direction dr1 and is directly connected to the gate electrode GE1. The first repair line RPL1 extends along the first direction dr1 and is spaced apart from the first gate line GL1. The first repair line RPL1 may be electrically connected to the first gate line GL1. In an embodiment, the first repair line RPL1 may be directly connected to the first gate electrode GE1 (and one or more gate electrodes, e.g., a gate electrode GE3, disposed on the same row as the first gate electrode GE1), so as to be electrically connected to the first gate line GL1. The first repair line RPL1 may also receive the same gate signal as the first gate line GL1. Accordingly, even when the first gate line GL1 is disconnected, the first switching element TR1 may still normally perform the switching operation. Meanwhile, in another embodiment, the first repair line RPL1 may be omitted. Further, the positions of the first repair line RPL1 and the first gate line GL1 may be mutually changed.

The first pixel unit PX1 may include a first storage line RL1. The first storage line RL1 may be disposed on the same layer as the plurality of gate lines including the first gate line GL1. The first storage line RL1 and the first gate line GL1 may be insulated from each other, and may be spaced apart from each other.

In an embodiment, the first storage line RL1 may be disposed to extend substantially in the first direction dr1, and may be spaced apart from the first gate line GL1 and the first repair line RPL1. A part of the first pixel electrode PE1 may be disposed to overlap the first storage line RL1. In the present specification, unless otherwise defined, "overlap" means that two components overlap each other in the thickness direction of the liquid crystal display device 1 (in the direction normal or perpendicular to the surface of the base substrate 210 in FIG. 9, e.g., the direction perpendicular to the first direction dr1 and the second direction dr2).

The first storage line RL1 includes a plurality of storage line protrusions including a first storage line protrusion RLP1 and a plurality of storage electrode patterns including a first storage electrode pattern RE11 and a second storage electrode pattern RE12.

The first storage line protrusion RLP1 may be a portion protruding from the first storage line RL1 (extending in the first direction dr1) to one side (bottom side) in the second direction dr2. The first storage line protrusion RLP1 may overlap a first contact hole CNT1, a first drain electrode extension DEP1, and a first drain electrode connection PE1d, which will be described later in more detail.

Each of the first storage electrode pattern RE11 and the second storage electrode pattern RE12 may be a portion protruding from the first storage line RL1 (extending in the first direction) to the other side (top side opposite the bottom side) in the second direction dr2. Each of the storage electrode patterns RE11 and RE12 may be located between the adjacent pixel electrodes in the first direction dr1. For example, the second storage electrode pattern RE12 may be located between the first pixel electrode PE1 and the third pixel electrode PE3. In the thickness direction, the second storage electrode pattern RE12 and the first storage electrode pattern RE11 may overlap the edge located at one end (right end) of the first pixel electrode PE1 in the first direction dr1 and the edge located at the other end (left end) of the first pixel electrode PE1 in the first direction dr1, respectively.

The first storage line protrusion RLP1, the first storage electrode pattern RE11, and the second storage electrode pattern RE12 may be directly connected or electrically connected to the first storage line RL1, and a storage voltage Vcst may be provided thereto. The first storage line protrusion RLP1, the first storage electrode pattern RE11, and the second storage electrode pattern RE12 are interconnected with each other at the first pixel electrode PE1, so that the aforementioned first storage capacitor Cst1 may be formed.

The gate conductor GW may be formed as a single layer made of at least one conductive metal selected from aluminum (Al), copper (Cu), molybdenum (Mo), chromium (Cr), titanium (Ti), tungsten (W), molybdenum tungsten (MoW), molybdenum titanium (MoTi), and copper/molybdenum titanium (Cu/MoTi), as a double layer made of two conductive metals selected therefrom, or as a triple layer made of three conductive metals selected therefrom. In the gate conductor GW, a plurality of gate lines including the first gate line GL1, a plurality of gate electrodes including the first gate electrode GE1, a plurality of storage lines including the storage line RL1, a plurality of storage line protrusions including the storage line protrusion RLP1, a plurality of storage electrode patterns including the storage electrode patterns RE11 and RE12, and the first repair line RPL1 may be concurrently or simultaneously formed through the same mask process.

A first insulating layer 221 may be disposed on the gate conductor GW. The first insulating layer 221 may be a gate insulating layer. In an embodiment, the first insulating layer 221 may be made of silicon nitride, silicon oxide, and/or the like. The first insulating layer 221 may have a multi-layer structure including at least two insulating layers having different physical properties.

A first semiconductor layer AW1 may be disposed on the first insulating layer 221. The first semiconductor layer AW1 may include a plurality of semiconductor patterns including a first semiconductor pattern SM1, a plurality of storage antireflective patterns including a first storage antireflective pattern ARP11 and a second storage antireflective pattern ARP12, and a plurality of gate antireflective patterns including first to eighth gate antireflective patterns ARP101 to ARP108.

The first semiconductor pattern SM1 may be disposed to overlap an inside region of the first gate electrode GE1. The first semiconductor pattern SM1 may form a channel region of the first switching element TR1. The first semiconductor pattern SM1 may be directly or electrically connected to the first source electrode SE1 and the first drain electrode DE1.

In one or more embodiments, in the first semiconductor pattern SM1, regions (source region and drain region) connected to the first source electrode and first drain electrode of the first switching element TR1 may be doped with impurity ions. For example, in the case of a PMOS transistor, a trivalent dopant such as boron (B) may be used as a p-type impurity ion, and, in the case of an NMOS transistor, a material such as n+ hydrogenated amorphous silicon and/or a material such as silicide may be used as an n-type impurity ion.

The first storage antireflective pattern ARP11 and the second storage antireflective pattern ARP12 may be disposed to overlap the first storage electrode pattern RE11 and the second storage electrode pattern RE12, respectively.

In an embodiment, the width L2 (for example, the dimension in the first direction dr1) of each of the first storage antireflective pattern ARP11 and the second storage antireflective pattern ARP12 may be approximately or substantially equal to the width L1 (for example, the dimension in the first direction dr1) of each of the first storage electrode pattern RE11 and the second storage electrode pattern RE12. For example, the widths L1 or L2 of each of the first storage antireflective pattern ARP11, the second storage antireflective pattern ARP12, the first storage electrode pattern RE11, and the second storage electrode pattern RE12 may be about 9 μm to about 13.5 μm. In this case, the thicknesses (in the thickness direction) of each of the first storage antireflective pattern ARP11 and the second storage antireflective pattern ARP12 may be, for example, about 700 Å to about 1000 Å.

Each of the first gate antireflective pattern ARP101 and the second gate antireflective pattern ARP102 may be disposed to overlap the first storage line RL1. The first gate antireflective pattern ARP101 and the second gate antireflective pattern ARP102 may be located with the first storage line protrusion RLP1 therebetween (in the first direction dr1).

The first gate antireflective pattern ARP101 may be disposed to overlap a portion of the first storage line RL1 at where the first storage line RL1 crosses or intersects the first data line DL1. The second gate antireflective pattern ARP102 may be disposed to overlap a portion of the first storage line RL1 at where the first storage line RL1 crosses or intersects the second data line DL2.

The first gate antireflective pattern ARP101 may reduce a coupling phenomenon between the first storage line RL1 and the first data line DL1. The second gate antireflective pattern ARP102 may reduce a coupling phenomenon between the first storage line RL1 and the second data line DL2.

Each of the third gate antireflective pattern ARP103 and the fourth gate antireflective pattern ARP104 may be disposed to overlap the first repair line RPL1. The third gate antireflective pattern ARP103 and the fourth gate antireflective pattern ARP104 may be located with the first gate electrode GE1 therebetween.

The third gate antireflective pattern ARP103 may be disposed to overlap a portion of the first repair line RPL1 at where the first repair line RPL1 crosses or intersects the first data line DL1. The fourth gate antireflective pattern ARP104 may be disposed to overlap a portion of the first repair line RPL1 at where the first repair line RPL1 crosses or intersects the second data line DL2.

The third gate antireflective pattern ARP103 may reduce a coupling phenomenon between the first repair line RPL1 and the first data line DL1. The fourth gate antireflective pattern ARP104 may reduce a coupling phenomenon between the first repair line RPL1 and the second data line DL2.

Each of the fifth gate antireflective pattern ARP105, the sixth gate antireflective pattern ARP106, the seventh gate antireflective pattern ARP107, and the eighth gate antireflective pattern ARP108 may be disposed to overlap the first gate line GL1. The fifth gate antireflective pattern ARP105 may be disposed to overlap a portion of the first gate line GL1 at where the first gate line GL1 crosses or intersects the first data line DL1. The sixth gate antireflective pattern ARP106 may be disposed to overlap a portion of the first gate line GL1 at where the first gate line GL1 crosses or intersects the second data line DL2. Each of the seventh gate antireflective pattern ARP107 and the eighth gate antireflective pattern ARP108 may be disposed to overlap a portion of the first gate line GL1 at where the first gate line GL1 crosses or intersects the first source electrode SE1. In another embodiment, the seventh gate antireflective pattern ARP107 and the eighth gate antireflective pattern ARP108 may contact each other, and may be one gate antireflective pattern (e.g., one integral body).

The fifth gate antireflective pattern ARP105 may reduce a coupling phenomenon between the first gate line GL1 and the first data line DL1. The sixth gate antireflective pattern ARP106 may reduce a coupling phenomenon between the first gate line GL1 and the second data line DL2. Each of the seventh gate antireflective pattern ARP107 and the eighth gate antireflective pattern ARP108 may reduce a coupling phenomenon between the first gate line GL1 and the first source electrode SE1.

Each storage antireflective pattern and each gate antireflective pattern are not limited to those shown in the drawings. In another embodiment, at least a part of each gate antireflective pattern may be omitted.

In an embodiment, the first semiconductor layer AW1 may include a semiconductor material such as amorphous silicon (a-Si) and/or polycrystalline silicon. In another embodiment, the first semiconductor layer AW1 may include an oxide semiconductor. When the first semiconductor layer AW1 includes an oxide semiconductor, the first semiconductor layer AW1 may be made of any one selected from IGZO (In—Ga-Zinc-Oxide), ZnO, $ZnO_2$, CdO, SrO, $SrO_2$, CaO, $CaO_2$, MgO, $MgO_2$, InO, $In_2O_3$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$.

As reflected light is reflected from the inside of the liquid crystal display device 1 to the outside thereof (among external light incident from the outside of the liquid crystal display device 1 to the inside thereof), a relatively large portion of the total reflected light is due to the gate reflected light reflected by the gate conductor GW. In one or more embodiments, each storage antireflective pattern and each gate antireflective pattern are disposed to overlap the gate conductor GW as much as possible, so that the gate reflected light may be reduced, and the total reflected light emitted from the liquid crystal display device 1 may be reduced. That is, the external light reflectance of the liquid crystal display device 1 (ratio of emitted reflected light to incident external light) may be reduced.

A data conductor DW may be disposed on the first semiconductor layer AW1. In one or more embodiments, the data conductor DW may further include an ohmic contact layer. The ohmic contact layer may be disposed on the first semiconductor layer AW1. The ohmic contact layer may be made of a material, such as n+ hydrogenated amorphous silicon doped with an n-type impurity (such as phosphorus at high concentration), and/or may be made of silicide. However, the ohmic contact layer may be omitted when the semiconductor layer 230 is made of an oxide semiconductor.

The data conductor DW may include a plurality of data lines including the first data line DL1 and the second data line DL2, a plurality of source electrodes including the first source electrode SE1, and a plurality of drain electrodes including the first drain electrode DE1.

The first source electrode SE1 may be branched from the first data line DL1 to one side in the first direction dr1. At least a part of the first source electrode SE1 may overlap a part of the first gate electrode GE1.

The first drain electrode DE1 may overlap the first gate electrode GE1, and may be disposed to be spaced apart from the first source electrode SE1 at a set or predetermined distance in the first direction dr1. Meanwhile, the first drain electrode DE1 may further include a first drain electrode extension DEP1. The first drain electrode extension DEP1 may overlap the first storage line protrusion and the first contact hole CNT1.

Although it is shown in the drawings that the first source electrode SE1 has an angular U shape and the first drain electrode DE1 is surrounded by the first source electrode SE1, the present invention is not limited thereto. The first source electrode SE1, the first drain electrode DE1, the first semiconductor pattern SM1, and the first gate electrode GE1 form the aforementioned first switching element TR1.

The first data line DL1 may be insulated from the first storage line RL1 and the first gate line GL1. The first data line DL1 may include a first bent portion BP1 and a second bent portion BP2 to prevent or protect from a short with the first drain electrode extension DEP1. The second data line DL2 may include a third bent portion BP3 and a fourth bent portion BP4 to prevent or protect from a short with the first drain electrode extension DEP1. The first data line DL1 and the second data line DL2, other than the respective bent portions, may extend substantially in the second direction dr2. The bent portions of the first data line DL1 and the second data line DL2 are bent toward one side and the other side in the first direction dr1. In an embodiment, the interval from the first drain electrode extension DEP1 to the first data line DL1 may be equal or substantially equal to the interval from the first drain electrode extension DEP1 to the second data line DL2.

The data conductor DW may be formed as a single layer made of at least one conductive metal selected from aluminum (Al), copper (Cu), molybdenum (Mo), chromium (Cr), titanium (Ti), tungsten (W), molybdenum tungsten (MoW), molybdenum titanium (MoTi), and copper/molybdenum titanium (Cu/MoTi), as a double layer made of two conductive metals selected therefrom, or as a triple layer made of three conductive metals selected therefrom. However, the present invention is not limited thereto, and the data conductor DW may be made of various suitable metals and/or conductors. The data conductor DW may be concurrently or simultaneously formed through the same mask process.

A second insulating layer 222 may be disposed on the data conductor DW. In an embodiment, the second insulating layer 222 may be a passivation film. The second insulating layer 222 includes a plurality of contact holes including a first contact hole CNT1 exposing at least a part of the first drain electrode extension DEP1.

The second insulating layer 222 may be made of an inorganic insulating material such as silicon nitride and/or silicon oxide. The second insulating layer 222 may prevent or protect pigments of color filters 230a, 230b, and 230c, which will be described later, from flowing into the first semiconductor pattern SM1.

Color filters 230a, 230b, and 230c may be disposed on the second insulating layer 222. The color filters 230a, 230b, and 230c may overlap the first contact hole CNT1 of the second insulating layer 222, and may include openings exposing at least a part of the first drain electrode extension DEP1.

The light having passed through the color filters 230a, 230b, and 230c may display one of the primary colors such as red, green, and blue. However, the display color of the light having passed through the color filters 230a, 230b, and 230c is not limited to the primary colors, and may be any one of cyan, magenta, yellow, and white.

In an embodiment, the color filters 230a, 230b, and 230c may be made of a material that displays different colors for each of the adjacent pixel units in the first direction dr1, and the adjacent pixel units in the second direction dr2 may be made of a material that displays the same color. For example, color filters of the same color may be formed in the first pixel unit PX1 and the second pixel unit PX2 adjacent to the first pixel unit PX1 in the second direction dr2, and the color may be one of red, green, and blue. Further, color filters of any one of colors other than the colors selected for the first pixel unit PX1 and the second pixel unit PX2 may be formed in the third pixel unit PX3 and the fourth pixel unit PX4 adjacent to the first pixel unit PX1 and the second pixel unit PX2 in first direction dr1. However, the present invention is not limited thereto, and, in another embodiment, the color filters may be made of a material that displays different colors for each of the adjacent pixel units regardless of direction. Although it is shown in FIGS. 9 and 10 that the color filters 230*a*, 230*b*, and 230*c* are provided as a part of or in the first display panel 200, unlike this, the color filters 230*a*, 230*b*, and 230*c* may be provided as a part of or in the second display panel 300.

A third insulating layer 250 may be disposed on the color filters 230*a*, 230*b*, and 230*c*. In an embodiment, the third insulating layer 250 may be a passivation film. The third insulating layer 250 may be made of an inorganic insulating material such as silicon nitride and/or silicon oxide. In another embodiment, the third insulating layer 250 may be omitted. The third insulating layer 250 may overlap the first contact hole CNT1 of the second insulating layer 222 and may include an opening exposing at least a part of the first drain electrode extension DEP1.

In one or more embodiments, an organic insulating film may be disposed between the color filters 230*a*, 230*b*, and 230*c* and the third insulating layer 250. The organic insulating film has certain desired (e.g., is excellent in) planarization properties, and may include an organic material having photosensitivity. The organic insulating film may overlap the first contact hole CNT1 of the second insulating layer 222, and may include an opening for exposing at least a part of the first drain electrode extension DEP1.

As described above, the openings of the color filters 230*a*, 230*b*, and 230*c* overlapping the first contact holes CNT1 of the second insulating layer 222, the opening of the organic insulating film, and the opening of the third insulating layer 250 may form the first contact hole CNT1.

A transparent conductor TW may be disposed on the third insulating layer 250. The transparent conductor TW may include a transparent conductive material. Here, the transparent conductive material may include polycrystalline, monocrystalline or amorphous ITO (Indium Tin Oxide). The transparent conductor TW may include a plurality of pixel electrodes including a first pixel electrode PE1 and a plurality of shielding electrodes including a first shielding electrode SC1.

The first pixel electrode PE1 may be in direct contact with the first drain electrode extension DEP1 exposed through the first contact hole CNT1. The first pixel electrode PE1 overlaps a common electrode 340. Accordingly, the first liquid crystal capacitor Clc1 (refer to FIG. 2) may be formed between the first pixel electrode PE1 and the common electrode 340, which overlap each other.

Hereinafter, the shape of the first pixel electrode PE1 will be described in more detail.

The first pixel electrode PE1 includes a plurality of stem electrodes, a plurality of first branch electrodes PE1*c* extending from the plurality of stem electrodes, and a first drain electrode connection PE1*d* contacting the first drain electrode extension DEP1.

The plurality of stem electrodes may include a first stem electrode PE1*a* extending in the first direction dr1 and a second stem electrode PE1*b* extending in the second direction dr2. In the drawings, the first stem electrode PE1*a* may be a transverse (latitudinal) stem electrode, and the second stem electrode PE1*b* may be a longitudinal stem electrode. In an embodiment, the first stem electrode PE1*a* and the second stem electrode PE1*b* may cross or intersect each other and may each be equally divided in length at the point of intersection.

The plurality of first branch electrodes PE1*c* may extend in a direction different from the first direction dr1 and the second direction dr2 from the first stem electrode PE1*a* and/or the second stem electrode PE1*b*. At least some of the plurality of first branch electrodes PE1*c* may overlap the first storage electrode pattern RE11 and the first antireflective pattern ARP11, and at least some other of the plurality of first branch electrodes PE1*c* may overlap the second storage electrode pattern RE12 and the second storage antireflective pattern ARP12.

Some of the plurality of first branch electrodes PE1*c* may extend to one side of the second direction dr2 to be connected to the first drain electrode connection PE1*d*. Therefore, together with the first drain electrode connection PE1*d* connected to the first drain electrode extension DEP1, the first stem electrode PE1*a*, the second stem electrode PE1*b*, and the plurality of first branch electrodes PE1*c* may be all electrically connected to each other, and may receive the same signal.

The first shielding electrode SC1 is insulated from the first pixel electrode PE1 and extends substantially in the first direction dr1. For example, the first shielding electrode SC1 may be located between the first pixel electrode PE1 and the second pixel electrode PE2 and between the third pixel electrode PE3 and the fourth pixel electrode PE4. In an embodiment, the first shielding electrode SC1 may overlap the first gate line GL1. A part of the first shielding electrode SC1 may be branched (branched out in the second direction dr2) to overlap a part of the first data line DL1 or the second data line DL2. For example, with respect to the first pixel unit PX1, the first shielding electrode SC1 may overlap a part of the second data line DL2, and simultaneously may overlap the second gate antireflective pattern ARP102, the fourth gate antireflective pattern ARP104, and the sixth gate antireflective pattern ARP106.

A voltage of the same level as the common electrode 340 is applied to the first shielding electrode SC1, so that an electric field is not formed between the first shielding electrode SC1 and the common electrode 340. In a related art liquid crystal display device not provided with the first shielding electrode SC1, the liquid crystal molecules 410 located in a region corresponding to the edge of a pixel have a high possibility of misalignment because a fringing electric field is weak between the first pixel electrode PE1 and the common electrode 340, and, as a result, a light leakage phenomenon occurs. However, in the liquid crystal display device 1 according to the present embodiment, since an electric field is not formed in a region where the first shielding electrode SC1 is formed, the misalignment of the liquid crystal molecules 410 located in the region is prevented. As a result, a light leakage phenomenon may be reduced.

In one or more embodiments, a first alignment film may be disposed on the transparent conductor TW. The first alignment film may induce the initial alignment of a plurality of liquid crystal molecules in the liquid crystal layer 400. In an embodiment, the first alignment film may include a polymer organic material having an imide group in the repeating unit of the main chain.

Next, the second display panel 300 will be described.

The second substrate 310 is disposed to face the base substrate 210. The second substrate 310 may be made of transparent glass and/or plastic, and, in an embodiment, may be made of the same material as the base substrate 210.

A black matrix 320 may be disposed on (under) the second substrate 310. The black matrix 320 may extend substantially in the first direction dr1, and may be disposed between adjacent pixel electrodes in the second direction dr2. For example, the black matrix 320 may be located between the first pixel electrode PE1 and the second pixel electrode PE2 and between the third pixel electrode PE3 and the fourth pixel electrode PE4.

The black matrix 320 may block and/or absorb the transmission of light between the adjacent pixel electrodes in the second direction dr2. The material of the black matrix 320 is not particularly limited as long as it can block and/or absorb light. In an embodiment, the black matrix 320 may be made of a photosensitive composition, an organic material, or a metallic material. In an embodiment, the photosensitive composition may include a binder resin, a polymerizable monomer, a polymerizable oligomer, a pigment, and a dispersant. The metallic material may include chromium.

A planarization layer 330 may be disposed on (under) the black matrix 320. The planarization layer 330 may provide planarity to the common electrode 340. The material of the planarization layer 330 is not particularly limited, and, in an embodiment, may include an organic material or an inorganic material.

The common electrode 340 may be disposed on the planarization layer 330. At least a part of the common electrode 340 may overlap the first pixel electrode PE1. In an embodiment, the common electrode 340 may be formed in the shape of a plate. That is, the common electrode 340 may be formed over the entire surface of the second substrate 310. However, the present invention is not limited thereto, and the common electrode 340 may include a plurality of slits. In an embodiment, the common electrode 340 may be made of a transparent conductive material such as ITO and/or IZO, or may be made of a reflective metal such as aluminum, silver, chromium, or an alloy thereof.

In one or more embodiments, a second alignment film may be disposed on (under) the common electrode 340. The second alignment film may induce the initial alignment of a plurality of liquid crystal molecules in the liquid crystal layer 400. In an embodiment, the second alignment film may be made of the same material as the first alignment film.

Next, the liquid crystal layer 400 will be described.

The liquid crystal layer 400 includes a plurality of liquid crystal molecules 410. In an embodiment, the plurality of liquid crystal molecules 410 may have a negative dielectric anisotropy, and may be vertically aligned in an initial alignment state. The plurality of liquid crystal molecules 410 may have a set or predetermined pretilt angle in the initial alignment state. The initial alignment of the plurality of liquid crystal molecules 410 may be induced by the aforementioned first and second alignment films. When an electric field is formed between the first display panel 200 and the second display panel 300, the plurality of liquid crystal molecules 410 change the polarization state of light transmitted through the liquid crystal layer 400 by tilting or rotating in a specific direction.

Hereinafter, domain regions of the first pixel unit PX1 and liquid crystal control will be described.

In an embodiment, the first pixel electrode PE1 may include first to fourth domain regions DM1 to DM4. Each of the domain regions DM1 to DM4 may be defined by first branch electrodes PE1c that are located differently with respect to the first stem electrode PE1a and the second stem electrode PE1b. For example, the first domain region DM1 may be defined by the first branch electrodes PE1c that are located in a region defined by the part of the first stem electrode PE1a extending in the first direction dr1 from its center toward the left side (the other side) and the part of the second stem electrode PE1b extending in the second direction dr2 from its center toward the top side (the other side). The second domain region DM2 may be defined by the first branch electrodes PE1c that are located in a region defined by the part of the first stem electrode PE1a extending in the first direction dr1 from its center toward the right side (the one side) and the part of the second stem electrode PE1b extending in the second direction dr2 from its center toward the top side (the other side). The third domain region DM3 may be defined by the first branch electrodes PE1c that are located in a region defined by the part of the first stem electrode PE1a extending in the first direction dr1 from its center toward the left side (the other side) and the part of the second stem electrode PE1b extending in the second direction dr2 from its center toward the bottom side (the one side). The fourth domain region DM4 may be defined by the first branch electrodes PE1c that are located in a region defined by the part of the first stem electrode PE1a extending in the first direction dr1 from its center toward the right side (the one side) and the part of the second stem electrode PE1b extending in the second direction dr2 from its center toward the bottom side (the one side). In an embodiment, the areas of the first to fourth domain regions DM1 to DM4 may be equal to each other, but the present invention is not limited thereto.

When an electric field is formed, the direction in which the liquid crystal molecules 410 in each of the domain regions DM1 to DM4 are inclined will be described in more detail below.

When an electric field is formed, in an embodiment, the plurality of liquid crystal molecules arranged in the first to fourth domain regions DM1 to DM4 may be controlled to be inclined toward an intersection or crossing point formed by the first stem electrode PE1a and the second stem electrode PE1b. In other words, the plurality of liquid crystal molecules 410 may be controlled to be inclined in a direction opposite to the direction in which the first branch electrodes PE1c extend.

As a result, the plurality of liquid crystal molecules 410 arranged in the first to fourth domain regions DM1 to DM4 are controlled to be inclined in various different directions, and the distributions of the liquid crystal molecules 410 inclined in the respective directions are all the same. Accordingly, the liquid crystal display device 1 may prevent or reduce a texture phenomenon, and may have uniform side viewability.

Next, a liquid crystal display device according to another embodiment of the present invention will be described. However, a description overlapping those components having been described with reference to FIGS. 1 to 10 may not be provided again, and the same/like reference numerals are used for the same/like components as those having been described with reference to FIGS. 1 to 10.

Figure 11:
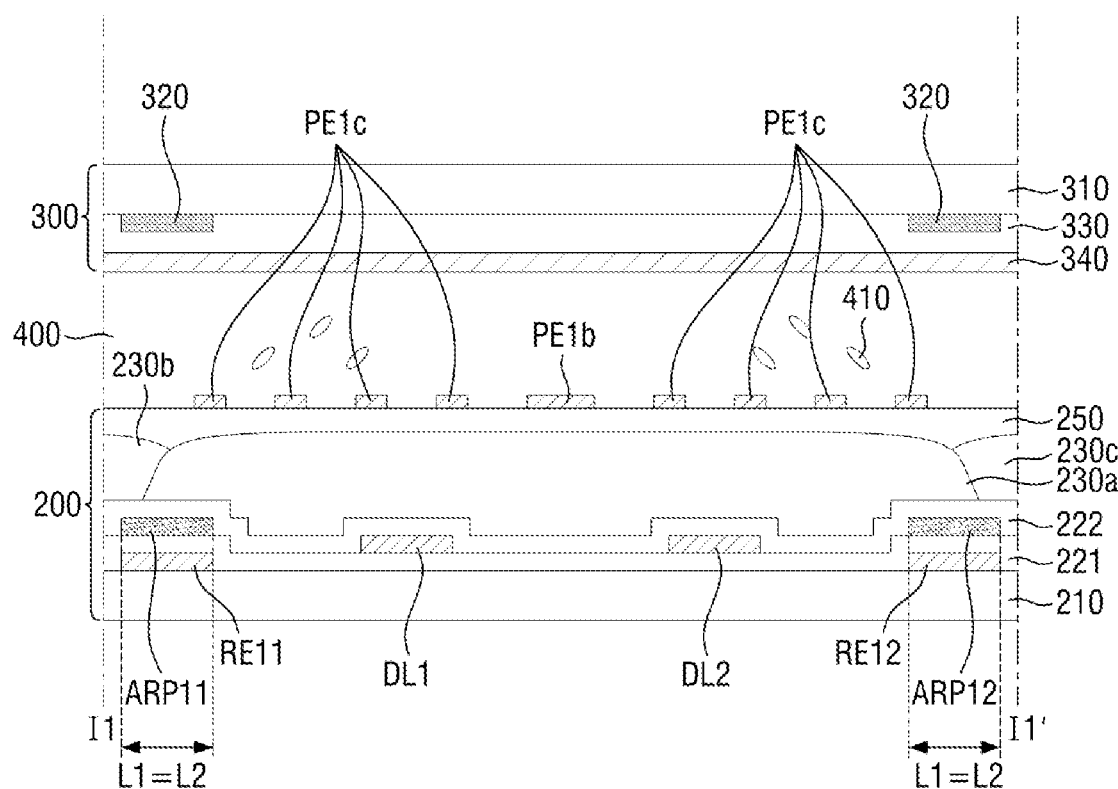
FIG. 11 is a cross-sectional view of a liquid crystal display device according to another embodiment.

FIG. 11 is a cross-sectional view of a liquid crystal display device according to another embodiment. FIG. 11 corresponds to a modified example of FIG. 9.

Referring to FIG. 11, a liquid crystal display device according to the present embodiment is different from the liquid crystal display device according to the embodiment of FIG. 9 in that the black matrix 320 is disposed to overlap the respective storage electrode patterns RE11 and RE12 and the respective storage antireflective patterns ARP11 and ARP12.

The black matrix 320 may be disposed between adjacent pixel electrodes (for example, PE1 and PE3) in the first direction dr1. In some embodiments, the ends of some branch electrodes PE1c may overlap the black matrix 320.

Also, the black matrix 320 may overlap the respective storage electrode patterns RE11 and RE12 and the respective storage antireflective patterns. Although it is shown in the drawing that the width of the black matrix 320 is equal to the width of each of the storage electrode patterns RE11 and RE12 or the width of each of the storage antireflective patterns ARP11 and ARP12, the present invention is not limited thereto. The width of the black matrix 320 may be narrower or wider than the width of each of the storage electrode patterns RE11 and RE12 or the width of each of the storage antireflective patterns ARP11 and ARP12.

The liquid crystal molecules 410 located in a region corresponding to the edge of each pixel electrode PE1 or the like have a high possibility of misalignment because a fringing electric field is weak between the first pixel electrode PE1 and the common electrode 340, and, as a result, a light leakage phenomenon may occur. In this case, the black matrix 320 provided in the second display panel 300 may overlap the adjacent pixel electrodes in the first direction dr1 to reduce a light leakage phenomenon.

Further, the black matrix 320 may reduce the external light incident on each of the storage electrode patterns RE11 and RE12 and each of the storage antireflective patterns ARP11 and ARP12. The black matrix 320 may block the reflected light emitted from each of the storage electrode patterns RE11 and RE12 and each of the storage antireflective patterns ARP11 and ARP12. Thus, the external light reflectance of the liquid crystal display device may be further reduced.

Figure 12:
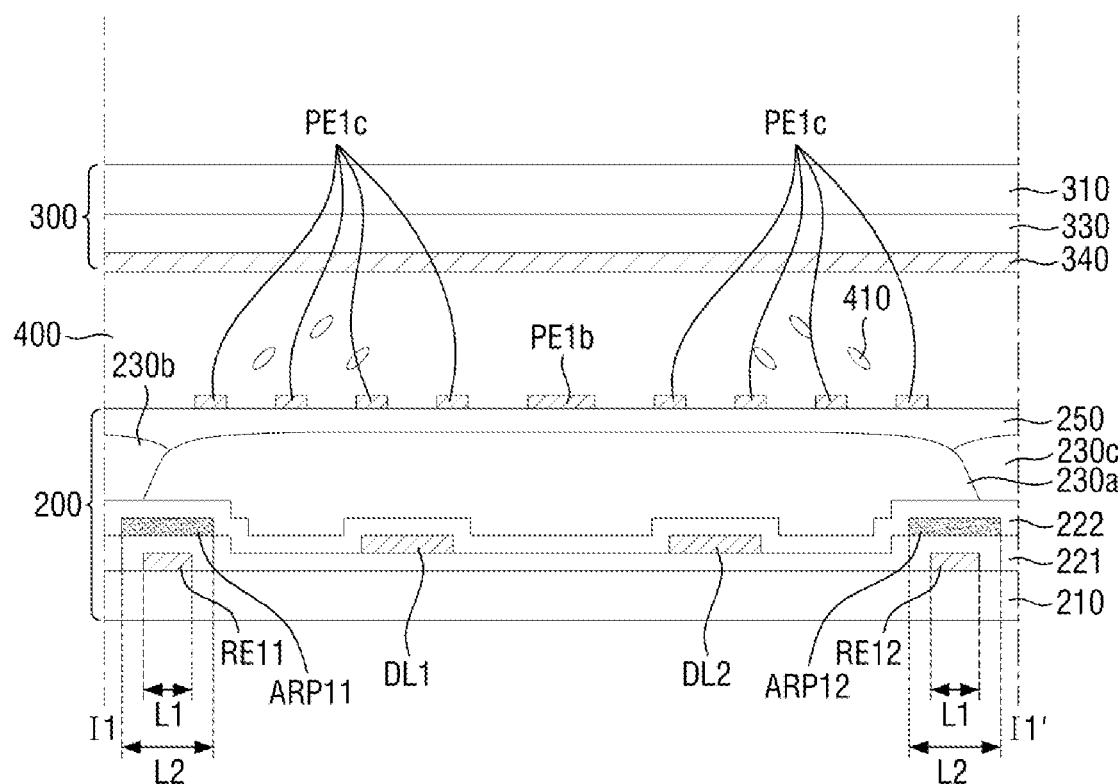
FIGS. 12 and 13 are cross-sectional views of liquid crystal display devices according to other embodiments.
Figure 13:
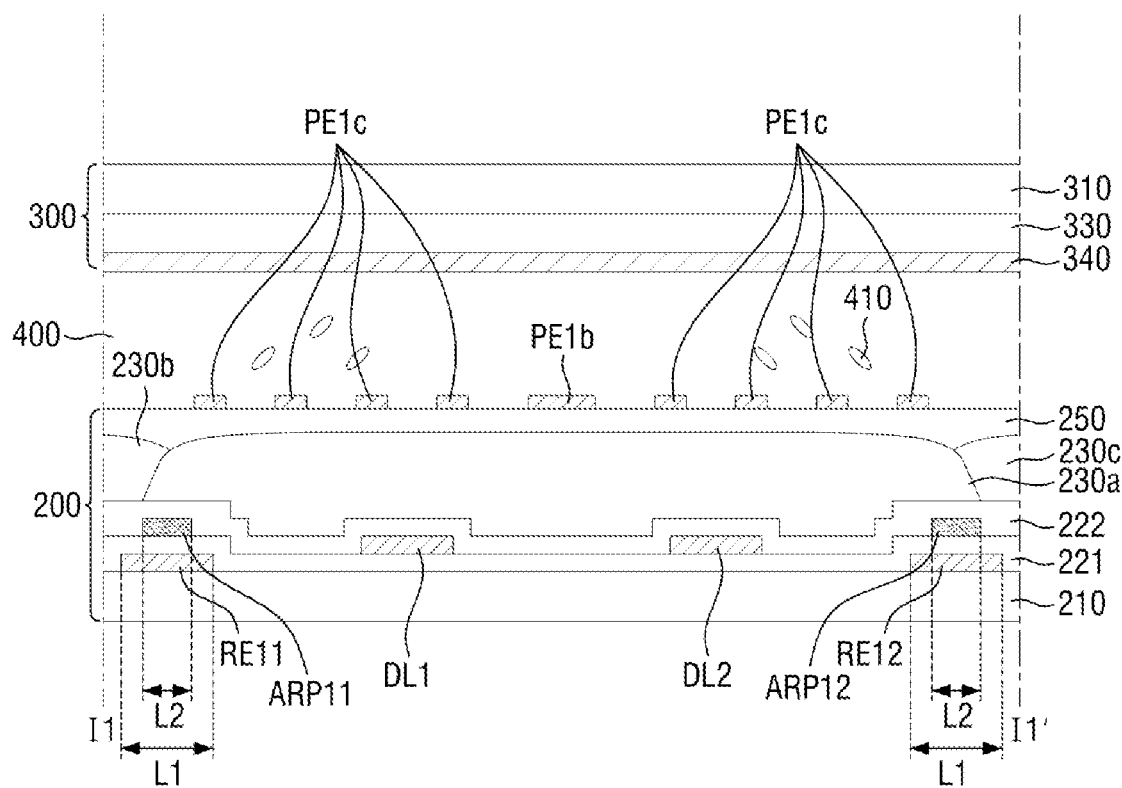

FIGS. 12 and 13 are cross-sectional views of liquid crystal display devices according to other embodiments. FIGS. 12 and 13 correspond to modified examples of FIG. 9.

Referring to FIGS. 12 and 13, liquid crystal display devices according to the present embodiments are different from the liquid crystal display device according to the embodiment of FIG. 9 in that the width of each of the storage electrode patterns RE11 and RE12 is different from the width of each of the storage antireflective patterns ARP11 and ARP12.

First, referring to FIG. 12, the width L2 of each of the storage antireflective patterns ARP11 and ARP12 may be wider than the width L1 of each of the storage electrode patterns RE11 and RE12. For example, the width L2 of each of the storage antireflective patterns ARP11 and ARP12 may be wider than the width L1 of each of the storage electrode patterns RE11 and RE12 by about 2 μm in one side and the other side (e.g., right and left sides) in the first direction dr1, respectively. That is, the width L2 of each of the storage antireflective patterns ARP11 and ARP12 may be wider than the width L1 of each of the storage electrode patterns RE11 and RE12 by about 3 μm to about 5 μm.

When the width L2 of each of the storage antireflective patterns ARP11 and ARP12 is wider than the width L1 of each of the storage electrode patterns RE11 and RE12, in spite of misalignment of the first display panel 200 and the second display panel 300 (thus, even if the width L2 of each of the storage antireflective patterns ARP11 and ARP12 is set such that the overlay of each of the storage electrode patterns RE11 and RE12 is slightly twisted), each of the storage antireflective patterns ARP11 and ARP12 may cover each of the storage electrode patterns RE11 and RE12, thereby reducing external light reflectance.

Referring to FIG. 13, the width L2 of each of the storage antireflective patterns ARP11 and ARP12 may be narrower than the width L1 of each of the storage electrode patterns RE11 and RE12. For example, the width L2 of each of the storage antireflective patterns ARP11 and ARP12 may be narrower than the width L1 of each of the storage electrodes pattern RE11 and RE12 by about 2 μm in one side and the other side in the first direction dr1, respectively. That is, the width L2 of each of the storage antireflective patterns ARP11 and ARP12 may be narrower than the width L1 of each of the storage electrode patterns RE11 and RE12 by about 3 μm to about 5 μm.

When the width L2 of each of the storage antireflective patterns ARP11 and ARP12 is narrower than the width L1 of each of the storage electrode patterns RE11 and RE12, coupling between each of the storage antireflective patterns ARP11 and ARP12 and each of the storage electrode patterns RE11 and RE12 may be reduced or minimized, and the respective intervals (in the first direction dr1) between the storage electrode patterns RE11 and RE12 and the adjacent data lines DL1 and DL2 may be reduced.

In embodiments, the width L2 of each of the storage antireflective patterns ARP11 and ARP12 may be within a range of ±2 μm with respect to the width L1 of each of the storage electrode patterns RE11 and RE12.

Figure 14:
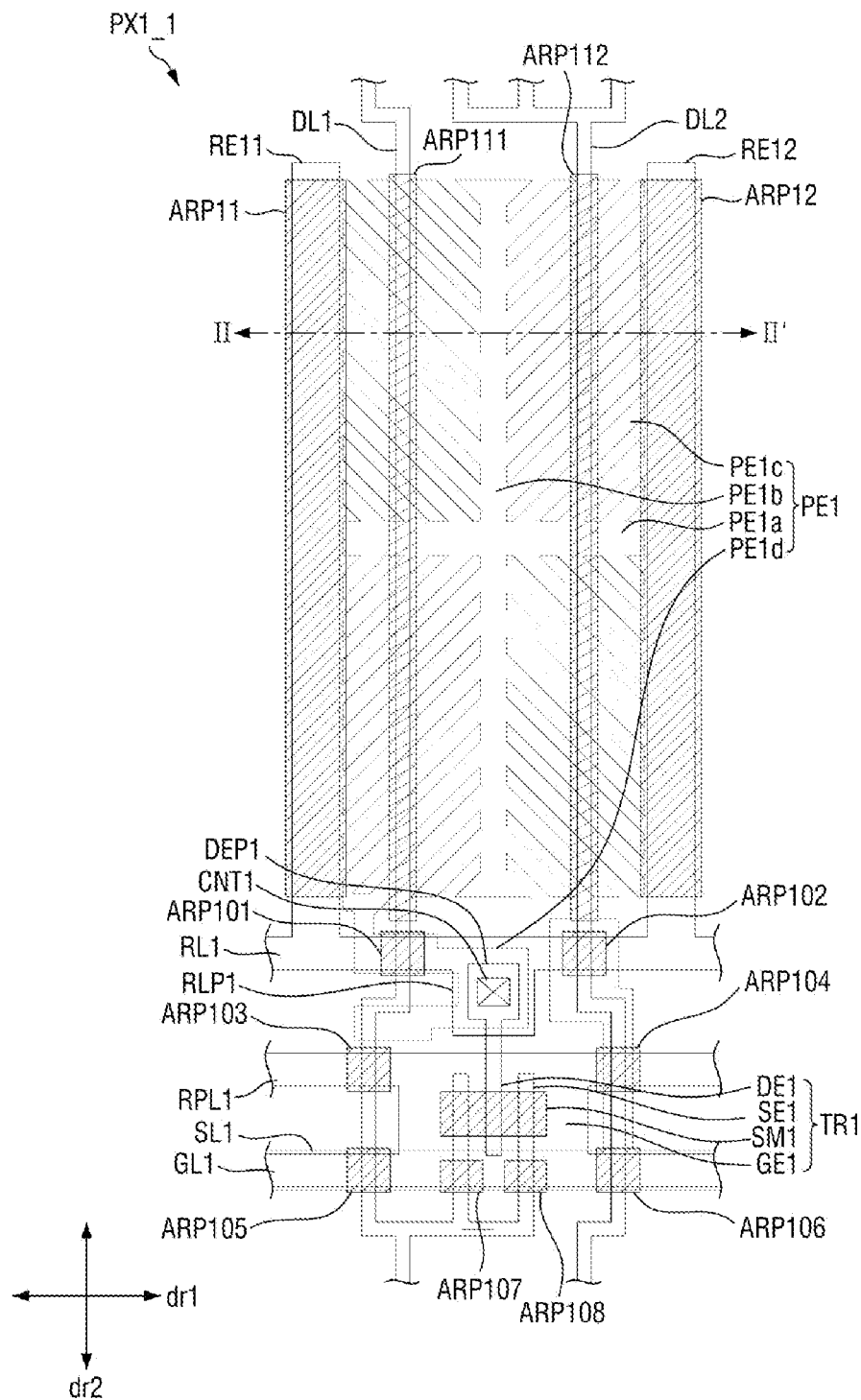
FIG. 14 is a layout view of a first pixel unit of another liquid crystal display device.
Figure 15:
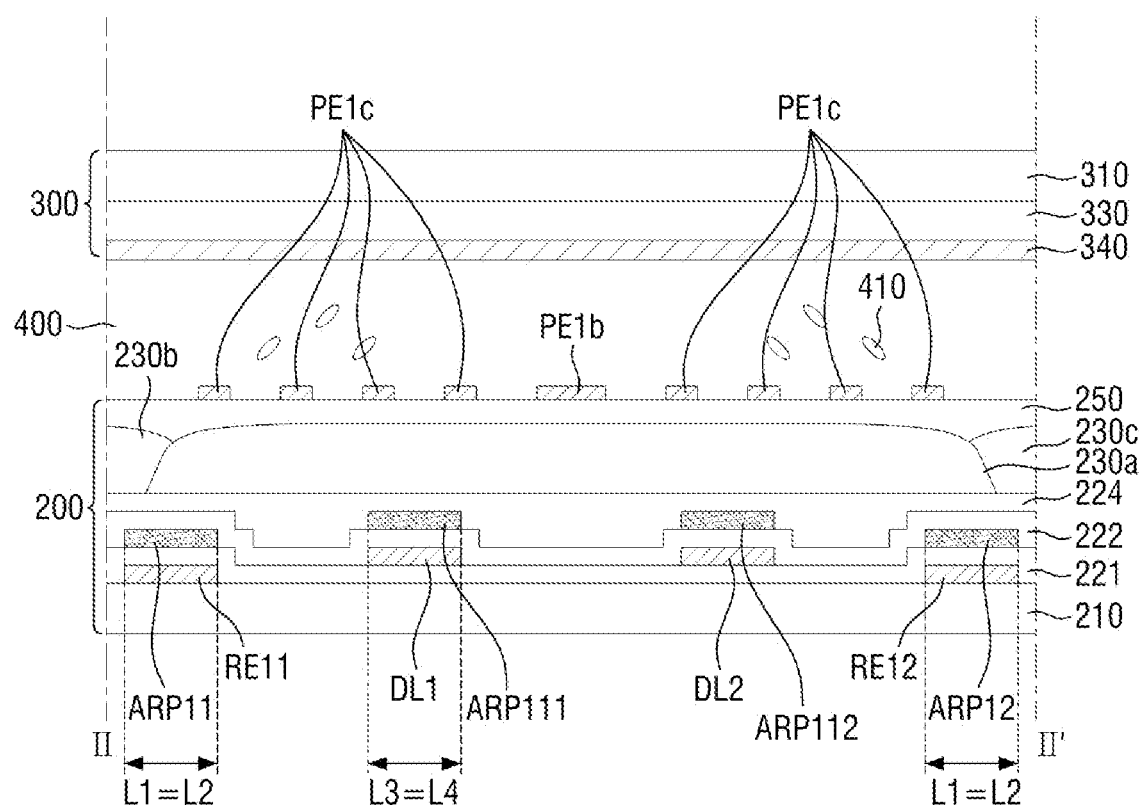
FIG. 15 is a cross-sectional view of a liquid crystal display device taken along the line II-II' of FIG. 14.

FIG. 14 is a layout view of a first pixel unit of another liquid crystal display device. FIG. 15 is a cross-sectional view of a liquid crystal display device taken along the line II-II' of FIG. 14.

Referring to FIGS. 14 and 15, a liquid crystal display device according to the present embodiment is different from the liquid crystal display according to the embodiment of FIGS. 4 and 9 in that this liquid crystal display device further includes a second semiconductor layer AW2 (ARP111 and ARP112) and a fourth insulating layer 224.

Hereinafter, a description will be made with reference to a first pixel unit PX1_1.

The second semiconductor layer AW2 and the fourth insulating layer 224 may be disposed between the color filters 230a, 230b, and 230c and the second insulating layer 222. Hereinafter, an arrangement relationship of the second semiconductor layer AW2 and the fourth insulating layer 224 will be described in more detail.

The second semiconductor layer AW2 may be disposed on the second insulating layer 222. The second semiconductor layer AW2 may include a plurality of data antireflective patterns including a first data antireflective pattern ARP111 and a second data antireflective pattern ARP112.

The first data antireflective pattern ARP111 may be disposed to overlap the first data line DL1. The first data antireflective pattern ARP111 may be formed in a region where the first pixel electrode PE1 is disposed. The width L4 of the first data antireflective pattern ARP111 may be equal to the width L3 of the first data line DL1, but the present invention is not limited thereto. The width L4 of the first data antireflective pattern ARP111 may be narrower or wider than the width L3 of the first data line DL1.

The second data antireflective pattern ARP112 may be disposed to overlap the second data line DL2. The second data antireflective pattern ARP112 may be formed in a region where the first pixel electrode PE1 is disposed. The width of the second data antireflective pattern ARP112 may be equal to the width of the second data line DL2, but the present invention is not limited thereto.

In an embodiment, the second semiconductor layer AW2 may be made of amorphous silicon (a-Si), polycrystalline silicon, or the like. In another embodiment, the second semiconductor layer AW2 may include an oxide semiconductor. When the second semiconductor layer AW2 includes an oxide semiconductor, the second semiconductor layer AW2 may be made of at least one oxide semiconductor selected from IGZO (In—Ga-Zinc-Oxide), ZnO, ZnO2, CdO, SrO, SrO$_2$, CaO, CaO$_2$, MgO, MgO$_2$, InO, In$_2$O$_2$, GaO, Ga$_2$O, Ga$_2$O$_3$, SnO, SnO$_2$, GeO, GeO$_2$, PbO, Pb$_2$O$_3$, Pb$_3$O$_4$, TiO, TiO$_2$, Ti$_2$O$_3$, and Ti$_3$O$_5$.

Each of the data antireflective patterns ARP111 and ARP112 may reduce external light reflectance by the data conductor. Accordingly, the external light reflectance of the liquid crystal display device may be further reduced.

The fourth insulating layer 224 may be disposed on the second semiconductor layer AW2. The fourth insulating layer 224 may be a passivation film. The fourth insulating layer 224 may be made of an inorganic insulating material such as silicon nitride and/or silicon oxide. In another embodiment, the fourth insulating layer 224 may be omitted. The fourth insulating layer 224 may overlap the first contact hole CNT1 of the second insulating layer 222, and may include an opening exposing at least a part of the first drain electrode extension DEP1.

Color filters 230a, 230b, and 230c may be sequentially disposed on the fourth insulating layer 224.

Figure 16:
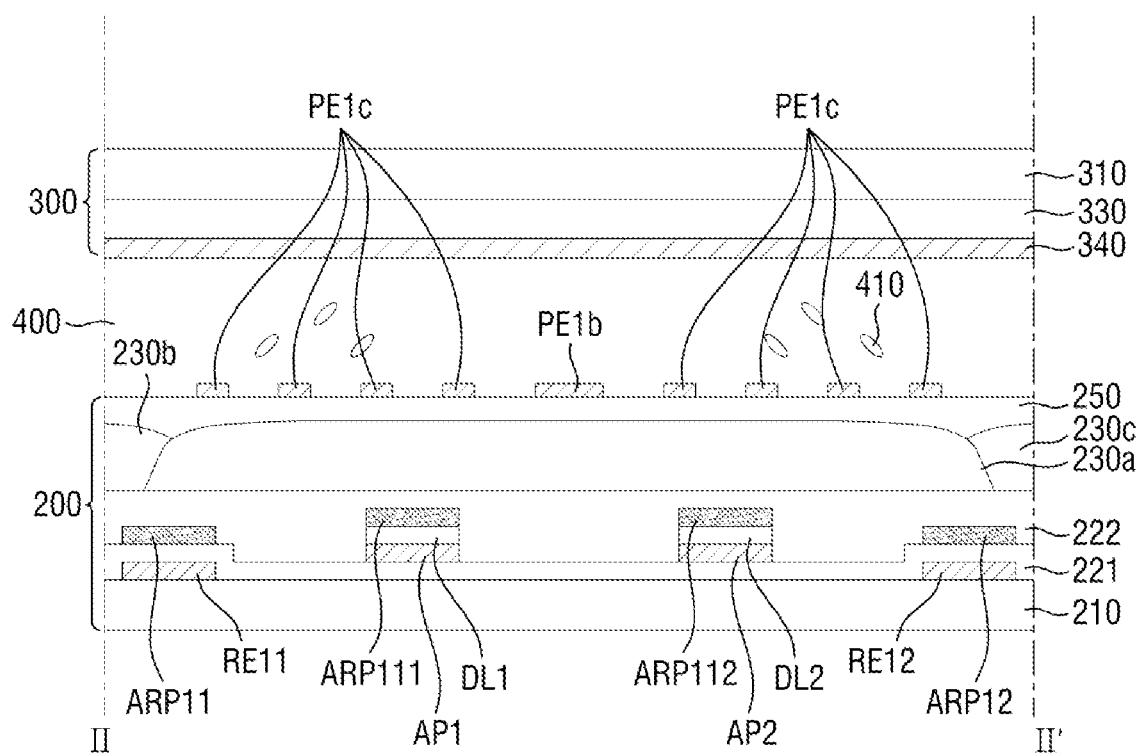
FIGS. 16-18 are cross-sectional views of liquid crystal display devices according to other embodiments.
Figure 17:
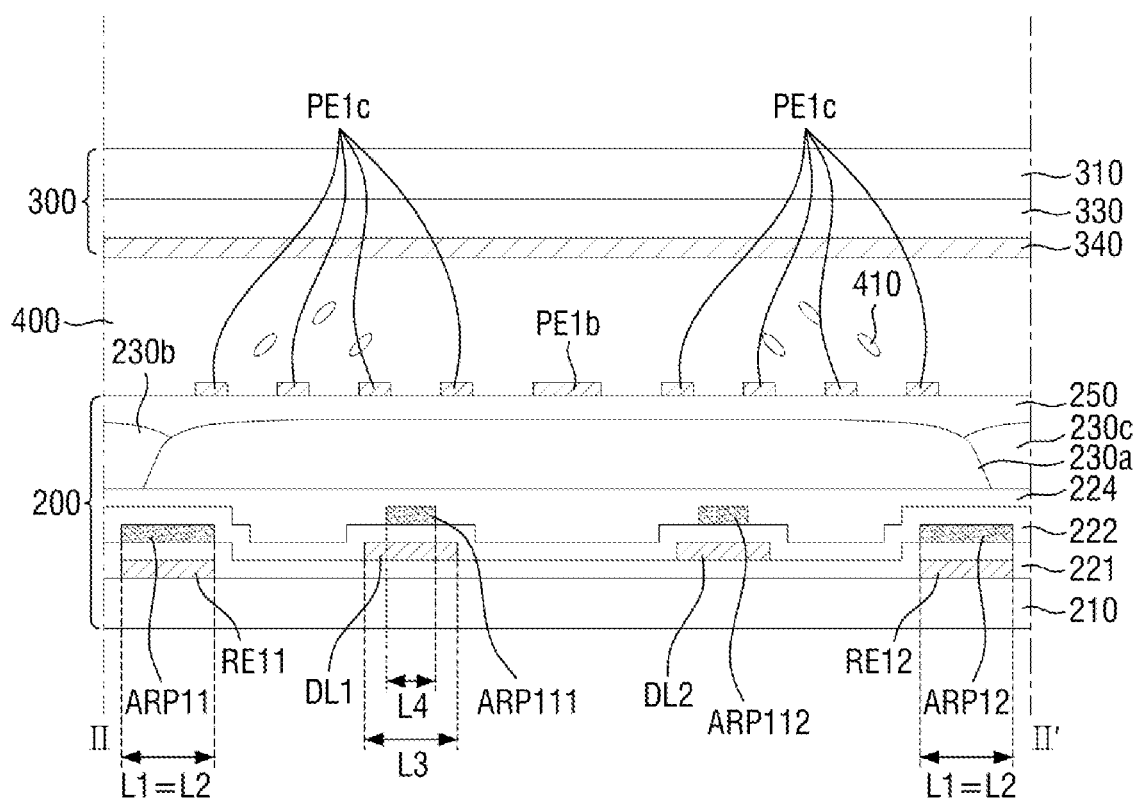
Figure 18:
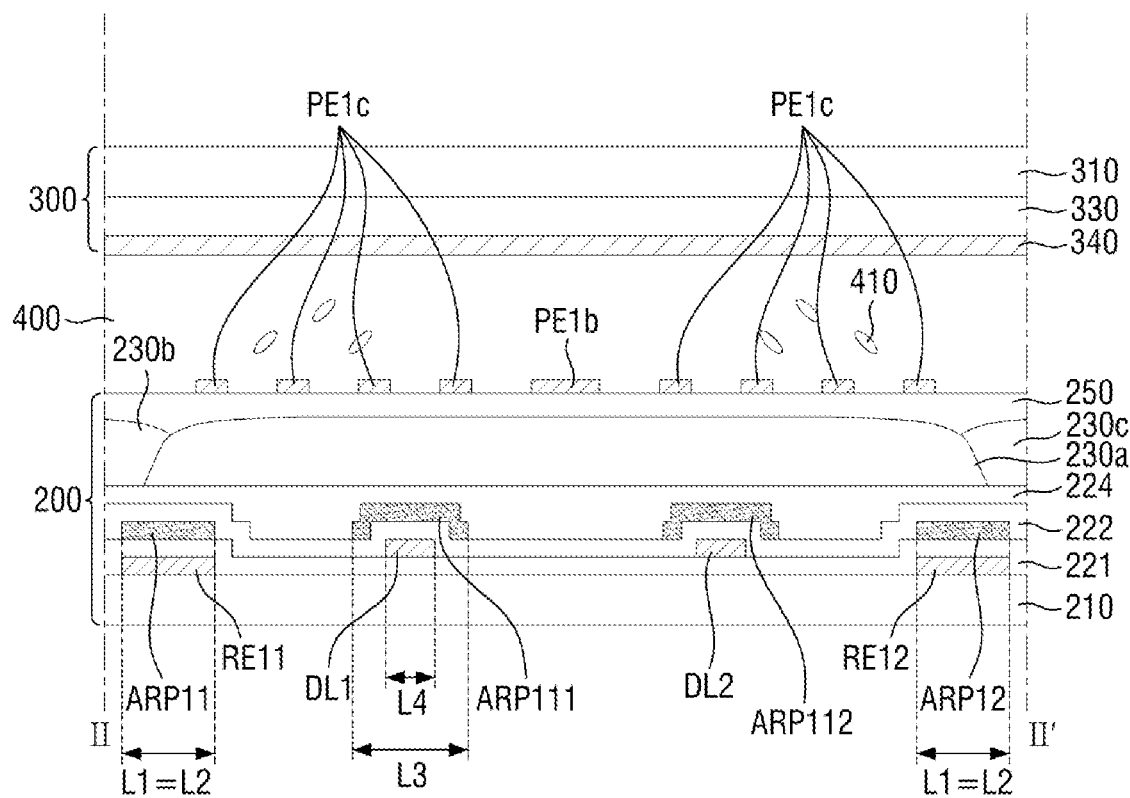

FIGS. 16 to 18 are cross-sectional views of liquid crystal display devices according to other embodiments. FIGS. 16 to 18 correspond to modified examples of FIG. 15.

Referring to FIG. 16, a liquid crystal display device according to the present embodiment is different from the liquid crystal display device according to the embodiment of FIG. 15 in that the fourth insulating layer (224) is omitted.

The second semiconductor layer AW2 may be directly disposed on the data conductor DW (e.g., the first data antireflective pattern ARP111 directly on the first data line DL1). In the present embodiment, the first semiconductor layer AW1, the data conductor DW, and the second semiconductor layer AW2 may each be formed by a single mask process.

The first data semiconductor pattern AP1 and the second data semiconductor pattern AP2 may be disposed under the first data line DL1 and the second data line DL2, respectively. The first data semiconductor pattern AP1 and the second data semiconductor pattern AP2 may correspond to the first semiconductor layer AW1. In another embodiment, the first data semiconductor pattern AP1 and the second data semiconductor pattern AP2 may be omitted.

Referring to FIGS. 17 and 18, liquid crystal display devices according to these embodiments are different from the liquid crystal display device according to the embodiment of FIG. 15 in that the width L3 of each of the data lines DL1 and DL2 is different from the width L4 of each of the data antireflective patterns ARP111 and ARP112.

The width L3 of each of the data lines DL1 and DL2 may be different from the width L4 of each of the data antireflective patterns ARP111 and ARP112. In embodiments, the width L4 of each of the data antireflective patterns ARP111 and ARP112 may be within the range of ±2 μm with respect to the width L3 of each of the data lines DL1 and DL2.

When the width L3 of each of the data lines DL1 and DL2 is set to be different from the width L4 of each of the data antireflective patterns ARP111 and ARP112, the liquid crystal display device may have an effect corresponding to the effect described with regard to the embodiment of FIGS. 12 and 13.

Figure 19:
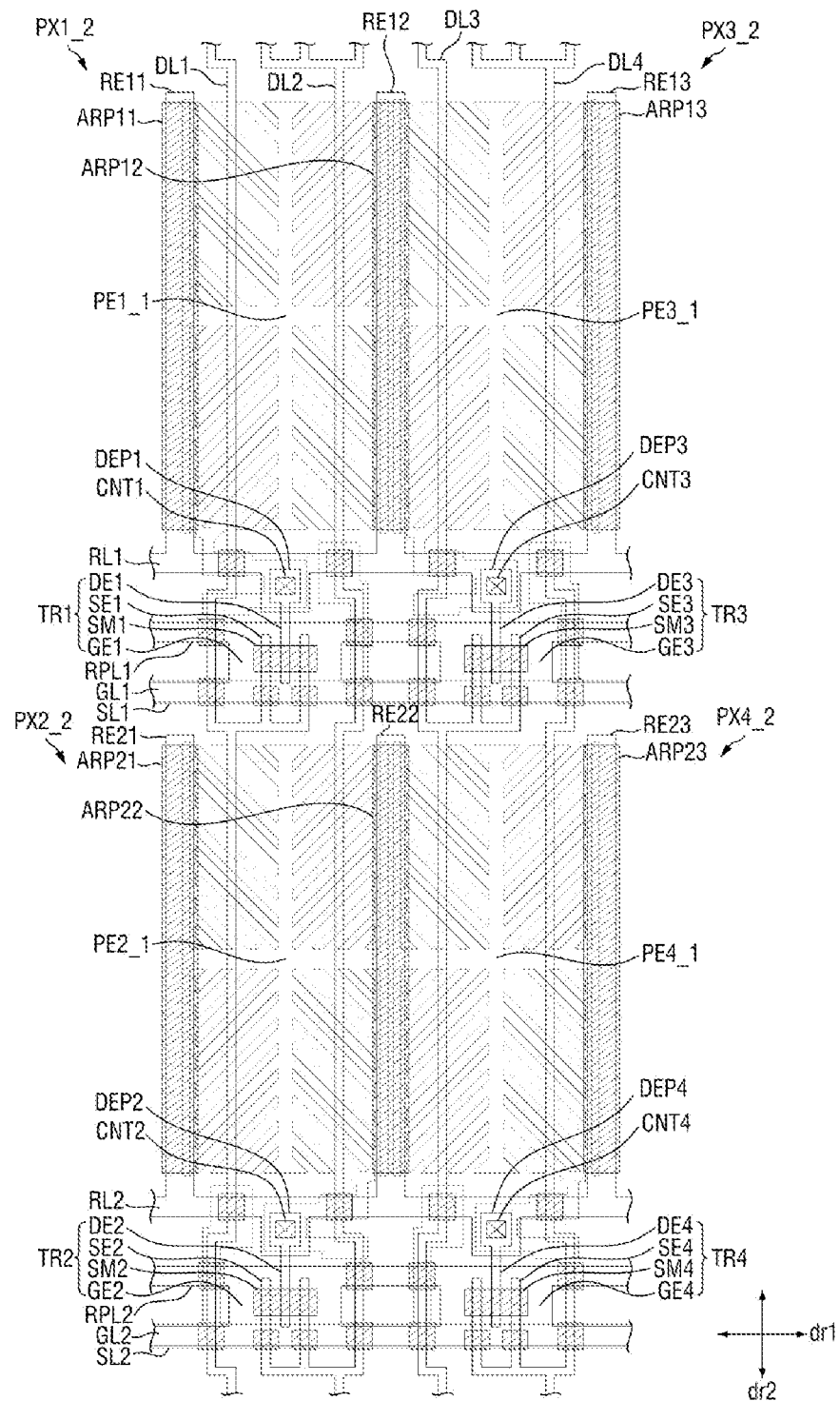
FIG. 19 is a layout view of first to fourth pixel units of a liquid crystal display device according to still another embodiment.
Figure 20:
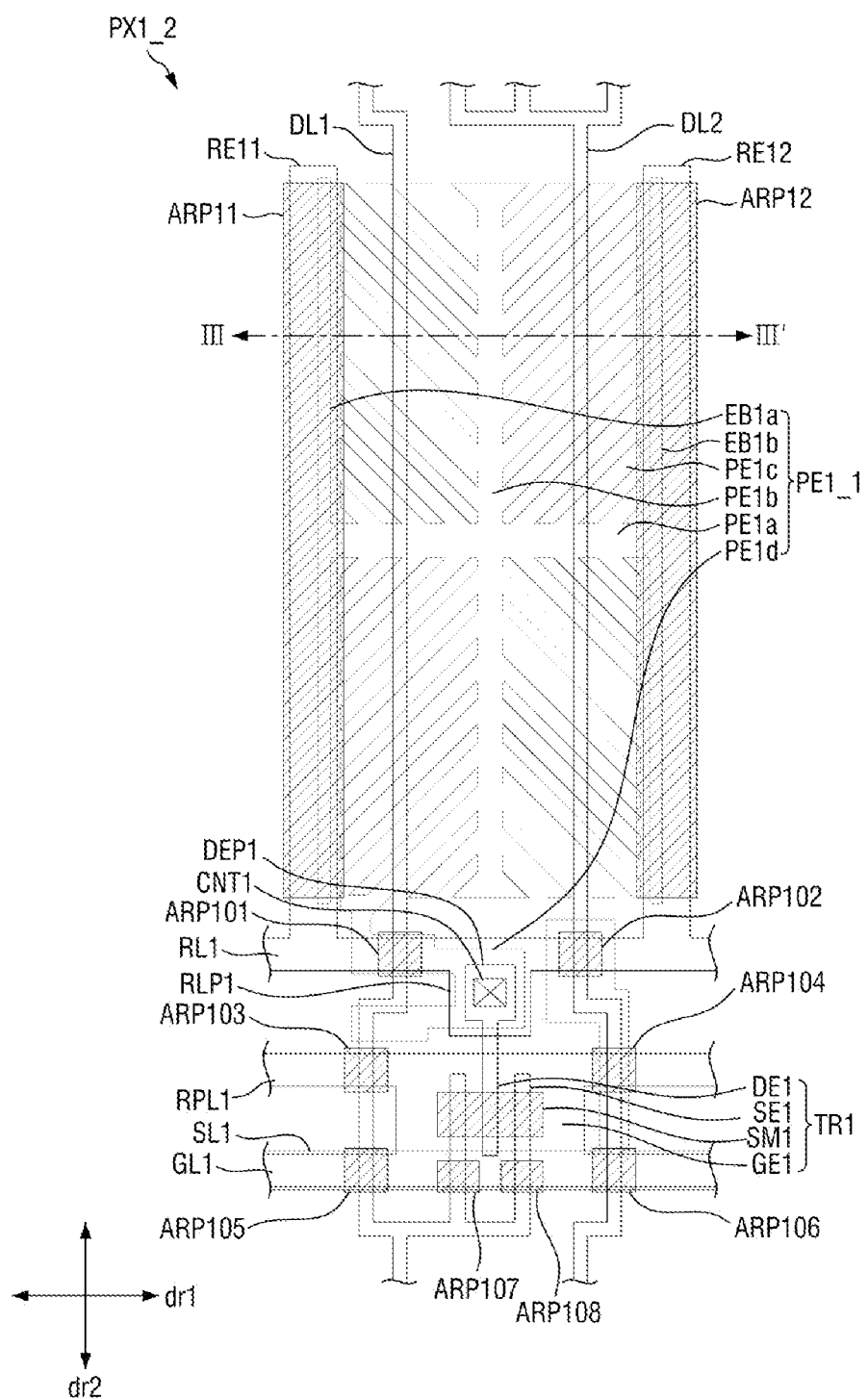
FIG. 20 is a detailed view of the first pixel unit of FIG. 19.
Figure 21:
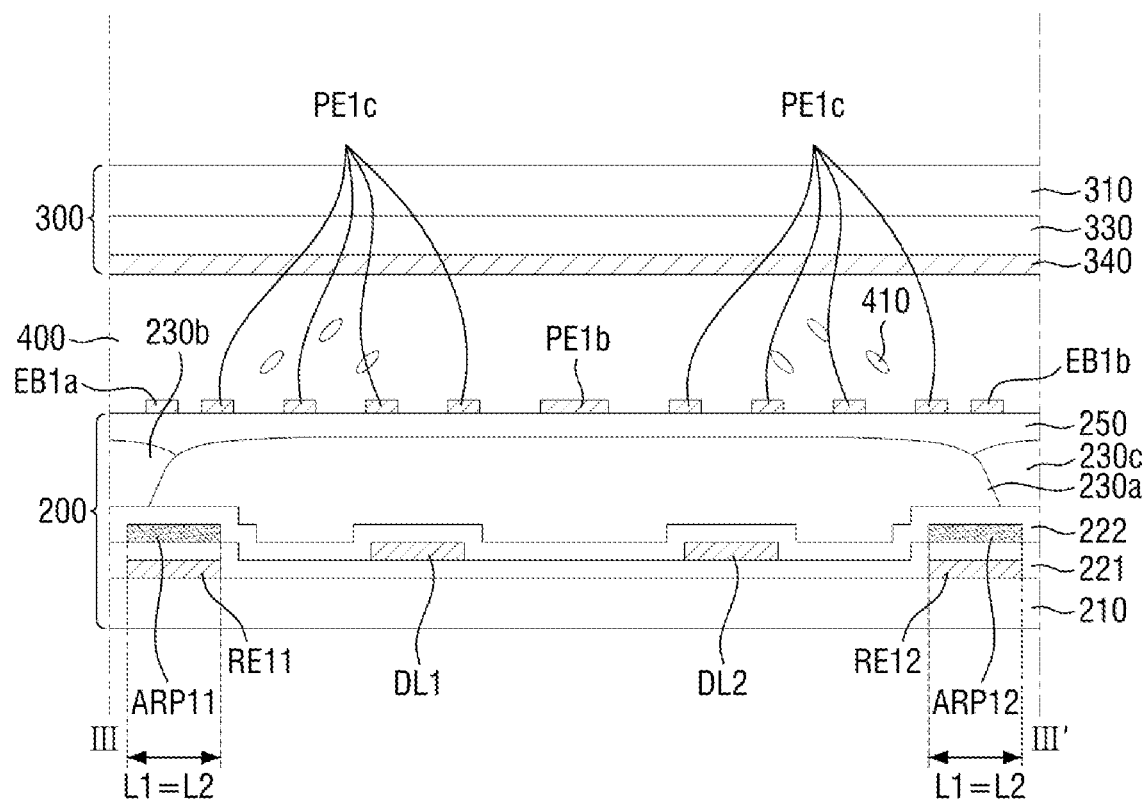
FIG. 21 is a cross-sectional view of a liquid crystal display device taken along the line III-III' of FIG. 20.

FIG. 19 is a layout view of first to fourth pixel units of a liquid crystal display device according to still another embodiment. FIG. 20 is a detailed view of the first pixel unit of FIG. 19. FIG. 21 is a cross-sectional view of a liquid crystal display device taken along the line III-III' of FIG. 20.

Referring to FIGS. 19 to 21, a liquid crystal display device according to the present embodiment is different from the liquid crystal display device according to the embodiment of FIGS. 3, 4, and 9 in that each pixel electrode further includes an edge electrode.

Hereinafter, a description will be made with reference to a first pixel unit PX1_2.

The first pixel electrode PE1_1 may include at least one edge electrode extending in the second direction dr2 and connected to the first stem electrode PE1a. For example, the first pixel electrode PE1_1 may include a first edge electrode EB1a connected to the other end (left end) of the first stem electrode PE1a in the first direction dr1 and overlapping the first storage electrode pattern RE11 and the first storage antireflective pattern ARP11. Further, the first pixel electrode PE1_1 may include a second edge electrode EB1b connected to one end (right end) of the first stem electrode PE1a in the first direction dr1 and overlapping the first storage electrode pattern RE11 and the second storage antireflective pattern ARP12.

Although it is shown in the drawings that the first edge electrode EB1a and the second edge electrode EB1b are not in contact with the first branch electrode, the present invention is not limited thereto. The first branch electrode may extend to be in contact with the first edge electrode EB1a and the second edge electrode EB1b.

Each of the edge electrodes EB1a and EB1b may reduce a liquid crystal alignment interference that may occur between adjacent pixel electrodes in the first direction dr1.

Figure 22:
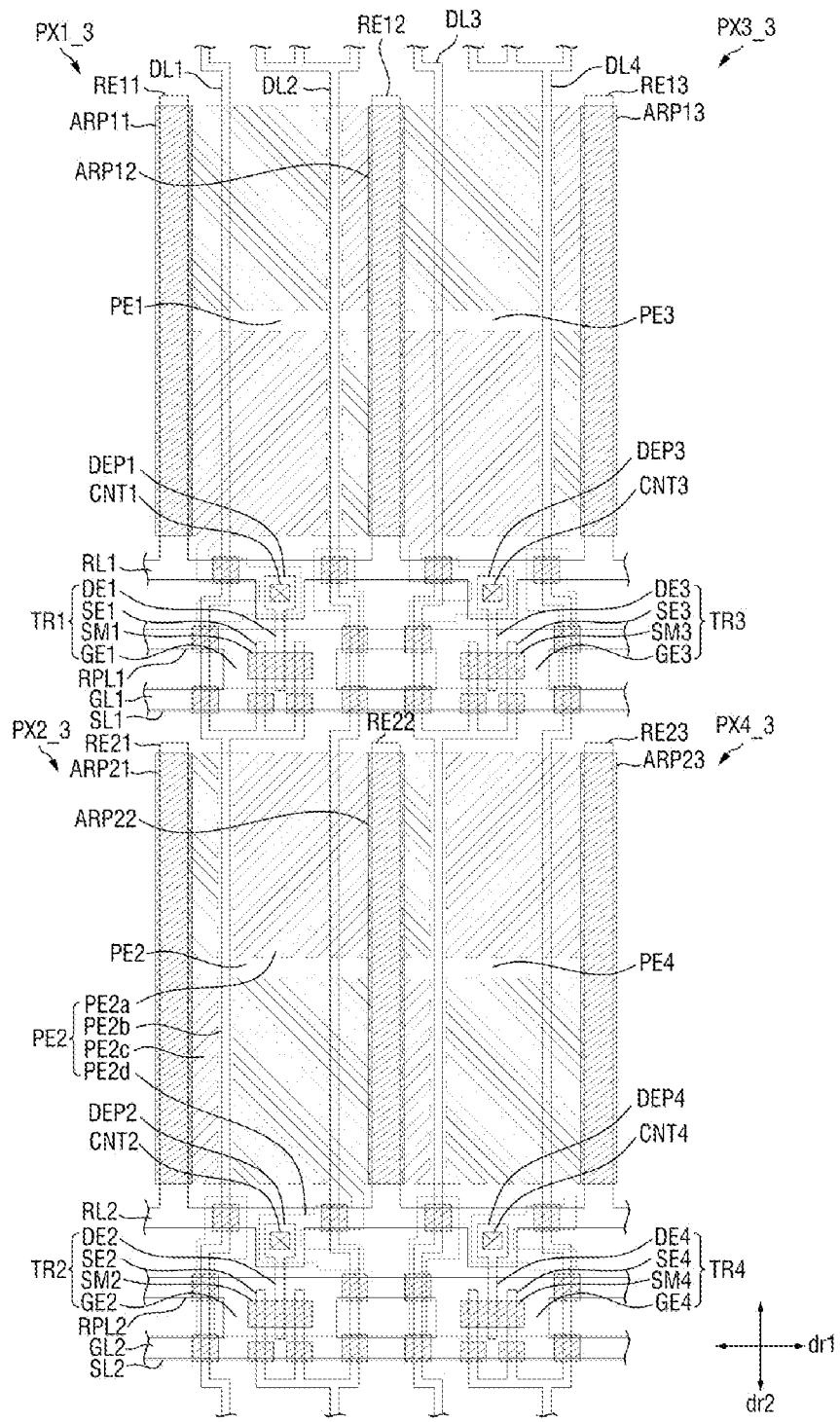
FIG. 22 is a layout view of first to fourth pixel units of a liquid crystal display device according to still another embodiment.
Figure 23:
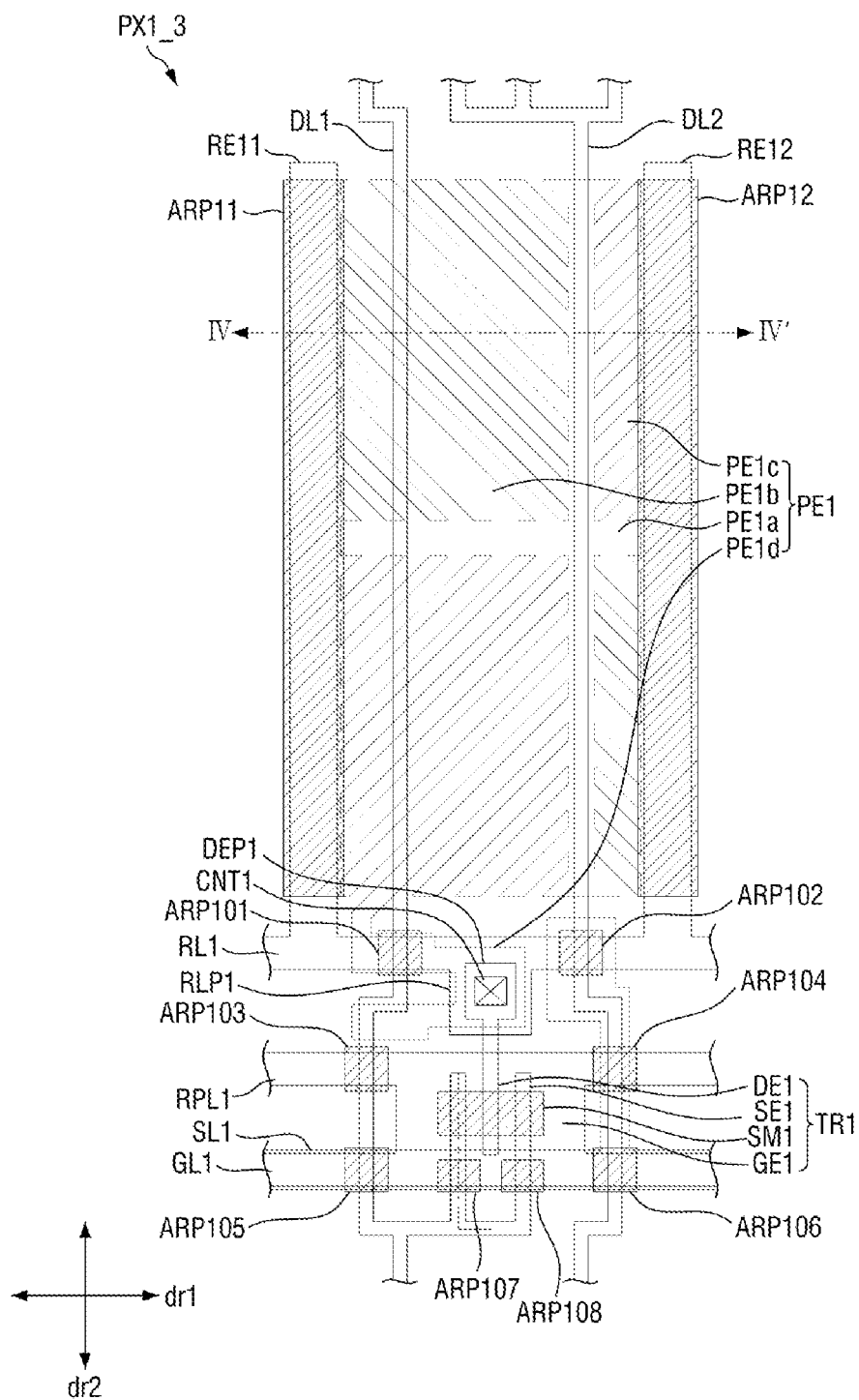
FIG. 23 is a detailed view of the first pixel unit of FIG. 22.
Figure 24:
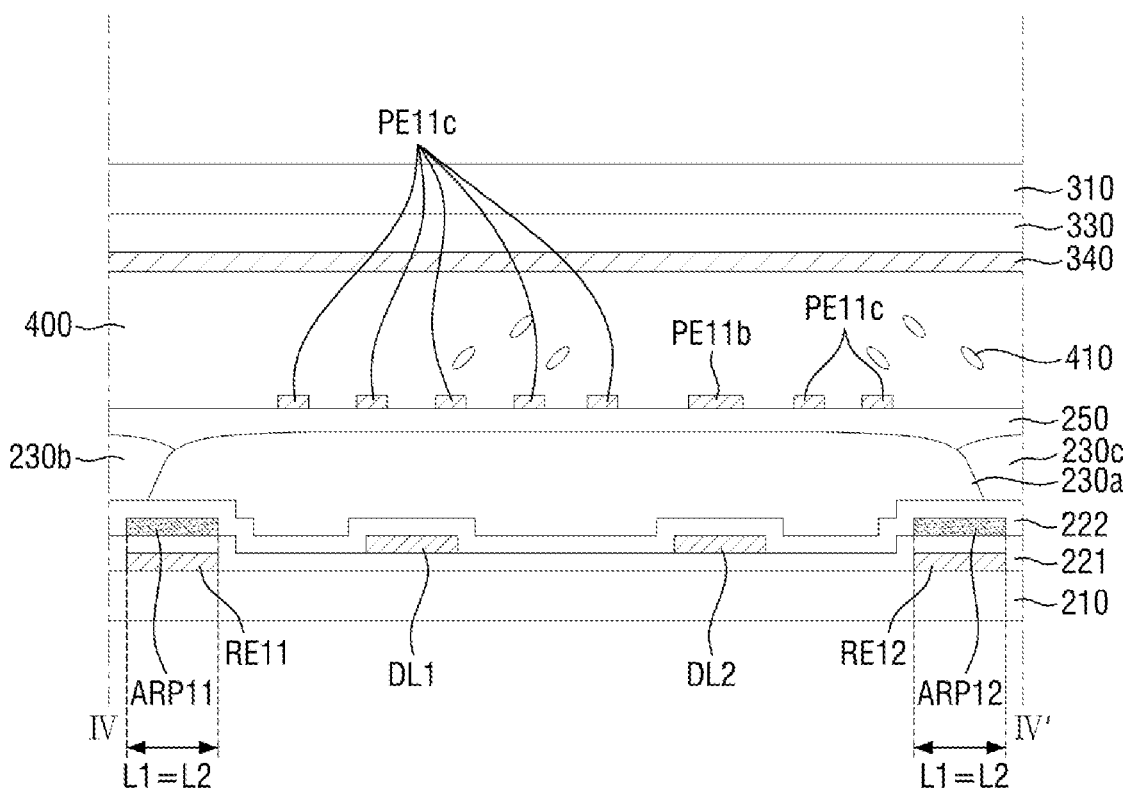
FIG. 24 is a cross-sectional view of a liquid crystal display device taken along the line IV-IV' of FIG. 23.

FIG. 22 is a layout view of first to fourth pixel units of a liquid crystal display device according to still another embodiment. FIG. 23 is a detailed view of the first pixel unit of FIG. 22. FIG. 24 is a cross-sectional view of a liquid crystal display device taken along the line IV-IV' of FIG. 23.

Referring to FIGS. 22 to 24, a liquid crystal display device according to the present embodiment is different from the liquid crystal display device according to the embodiment of FIGS. 3, 4, and 9 in that the second stem electrode of each pixel electrode is disposed to overlap the data line.

Hereinafter, a description will be made with reference to a first pixel unit PX1_3 and a second pixel unit PX2_3.

The first pixel electrode PE1 may be electrically connected to the first data line DL1, and the second pixel electrode PE2 may be electrically connected to the second data line DL2.

Also, the second stem electrode PE1b of the first pixel electrode PE1 may be disposed to overlap the second data line DL2. Accordingly, with respect to the second stem electrode PE1b of the first pixel electrode PE1, the length of each of the first branch electrodes PE1c disposed at the other side (left side) in the first direction dr1 may be substantially longer than the length of each of the first branch electrodes PE1c disposed at one side (right side) in the first direction dr1.

The second stem electrode PE2b of the second pixel electrode PE2 may be disposed to overlap the first data line DL1. Accordingly, with respect to the second stem electrode PE2b of the second pixel electrode PE2, the length of each of the second branch electrodes PE2c disposed at one side (right side) in the first direction dr1 may be substantially longer than the length of each of the second branch electrodes PE2c disposed at the other side (left side) in the first direction dr1.

The second stem electrodes PE1b and PE2b of the pixel electrodes PE1 and PE2 are arranged to overlap the data lines DL1 and DL2, thereby increasing the aperture ratio of the liquid crystal display device.

Figure 25:
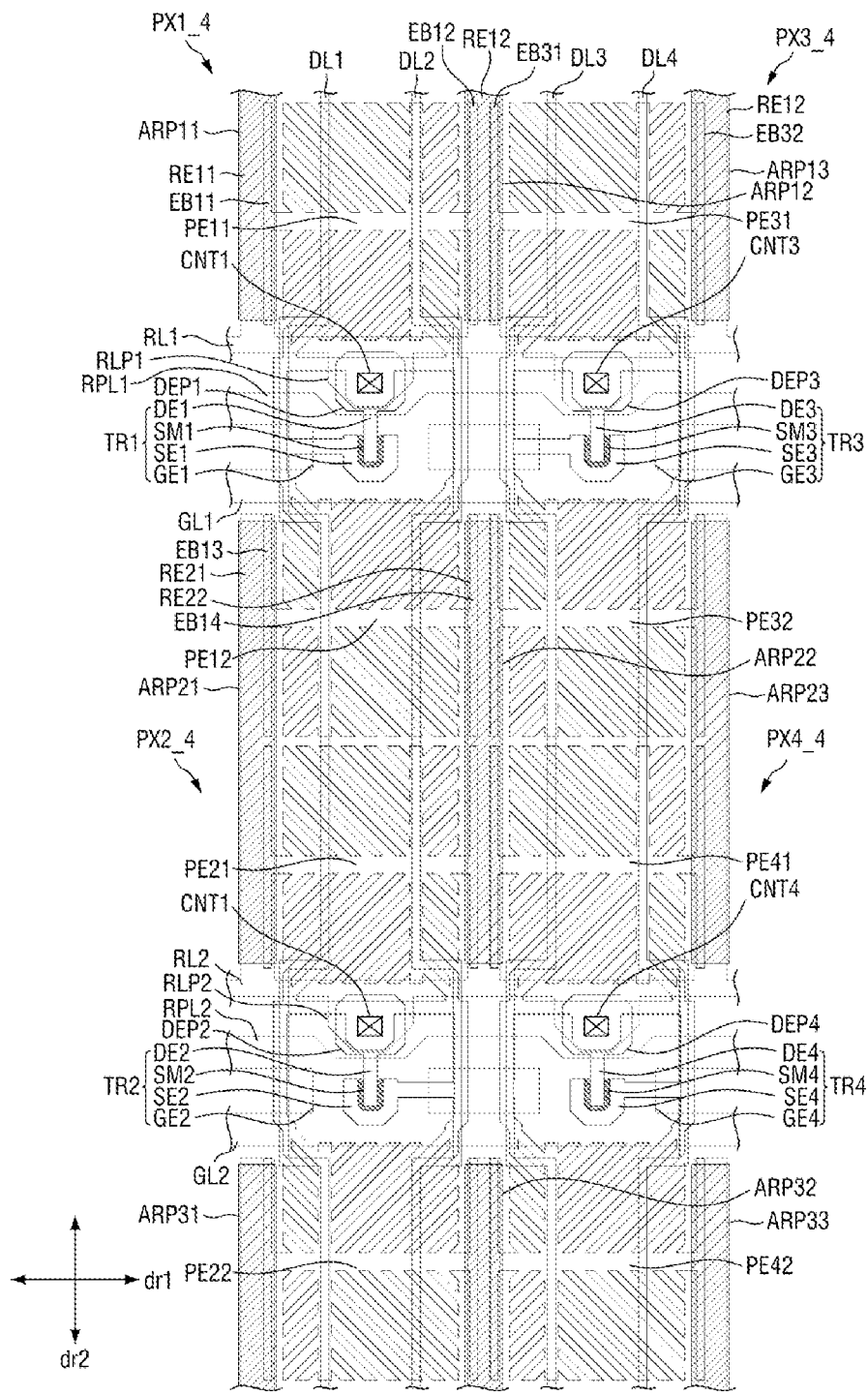
FIG. 25 is a layout view of first to fourth pixel units of a liquid crystal display device according to still another embodiment.
Figure 26:
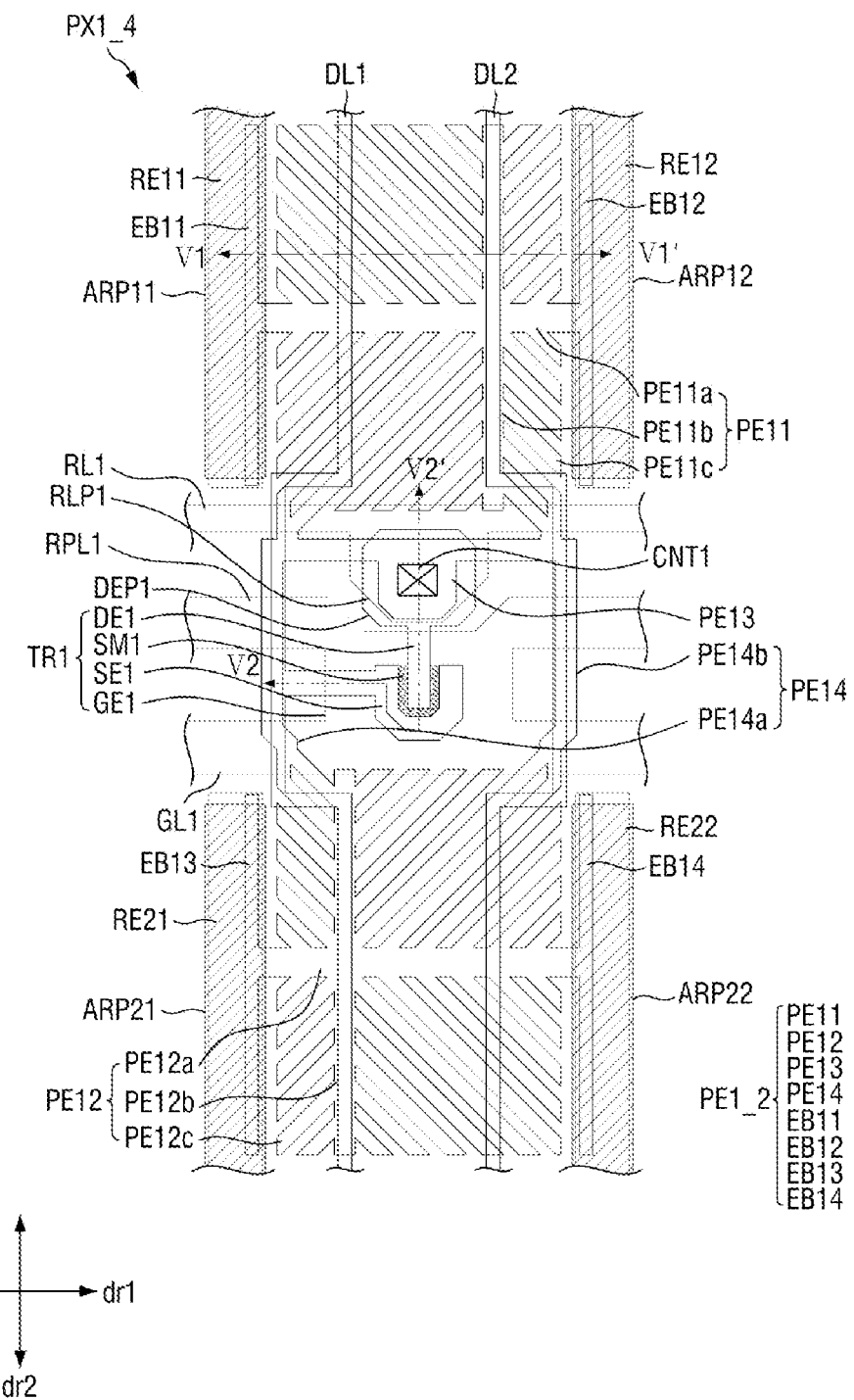
FIG. 26 is a detailed view of the first pixel unit of FIG. 25.
Figure 27:
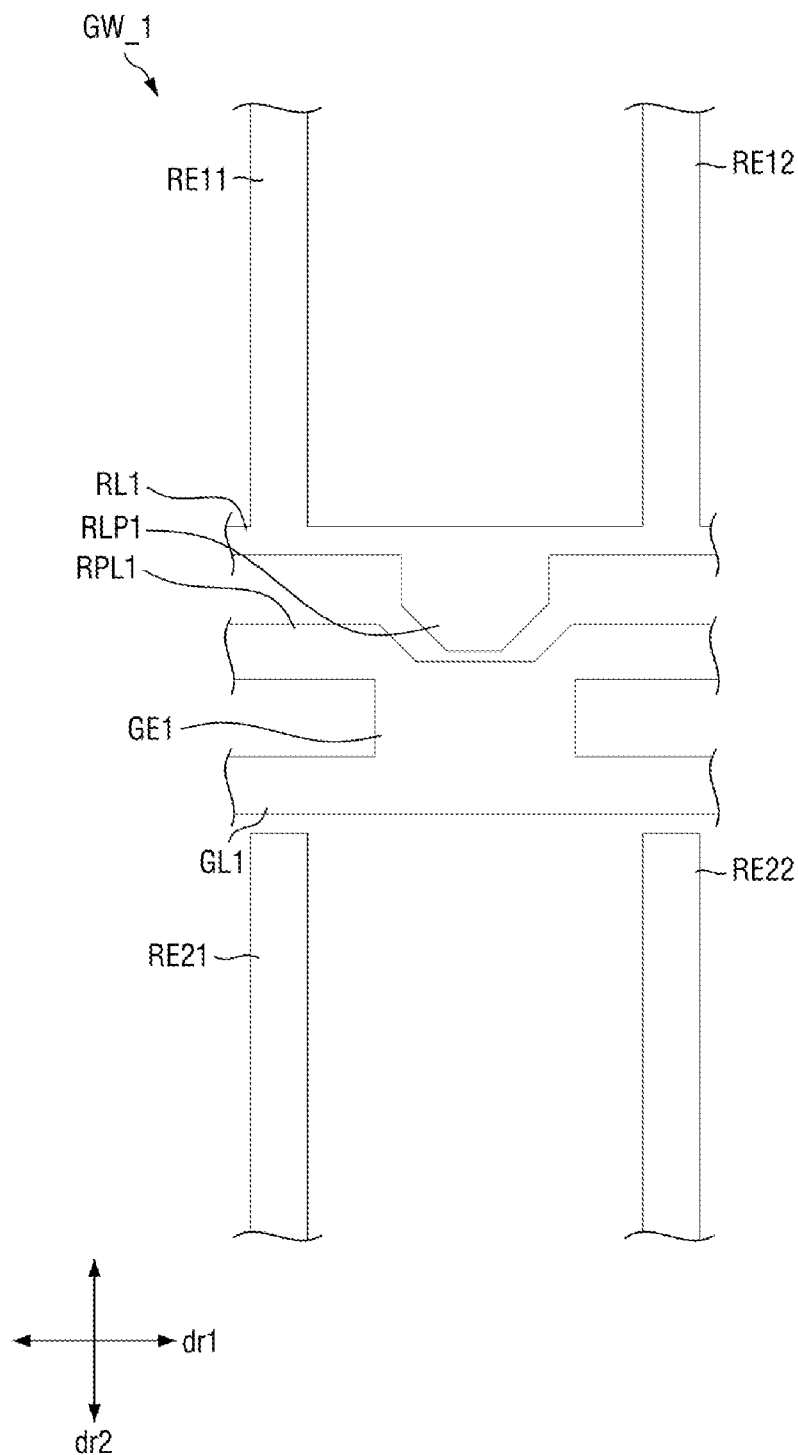
FIG. 27 is a view showing a gate conductor included in the first pixel unit shown in FIG. 26.
Figure 28:
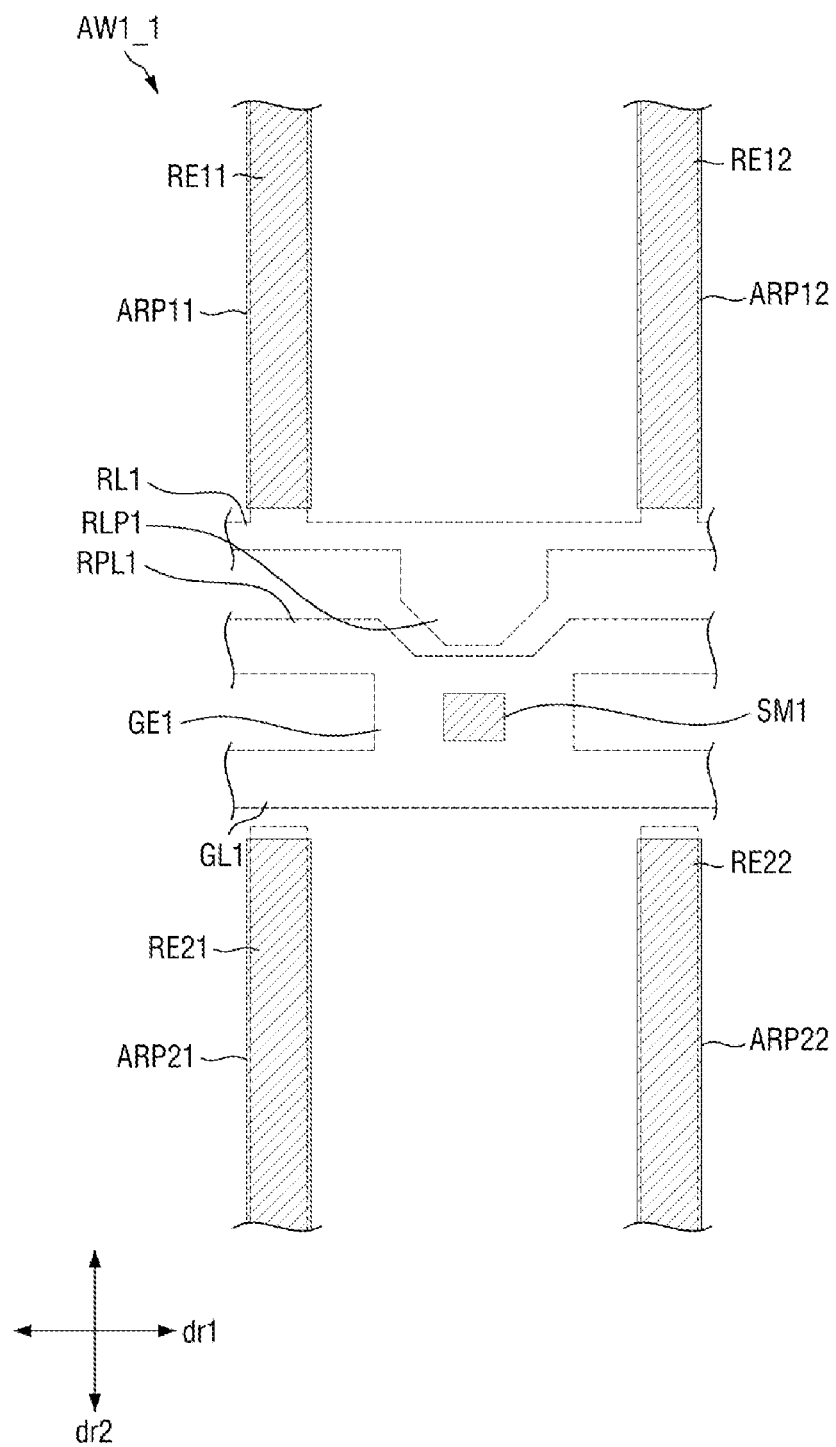
FIG. 28 is a view showing a first semiconductor layer included in the first pixel unit shown in FIG. 26.
Figure 29:
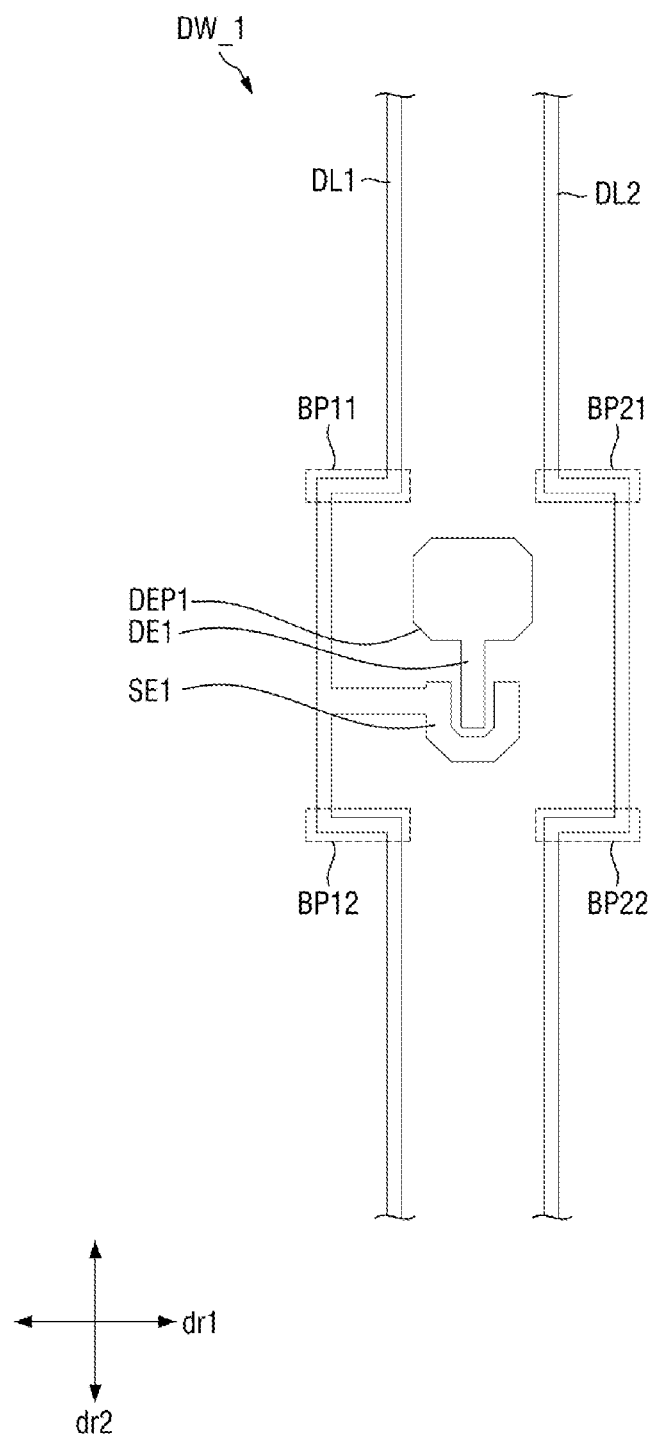
FIG. 29 is a view showing a data conductor included in the first pixel unit shown in FIG. 26.
Figure 30:
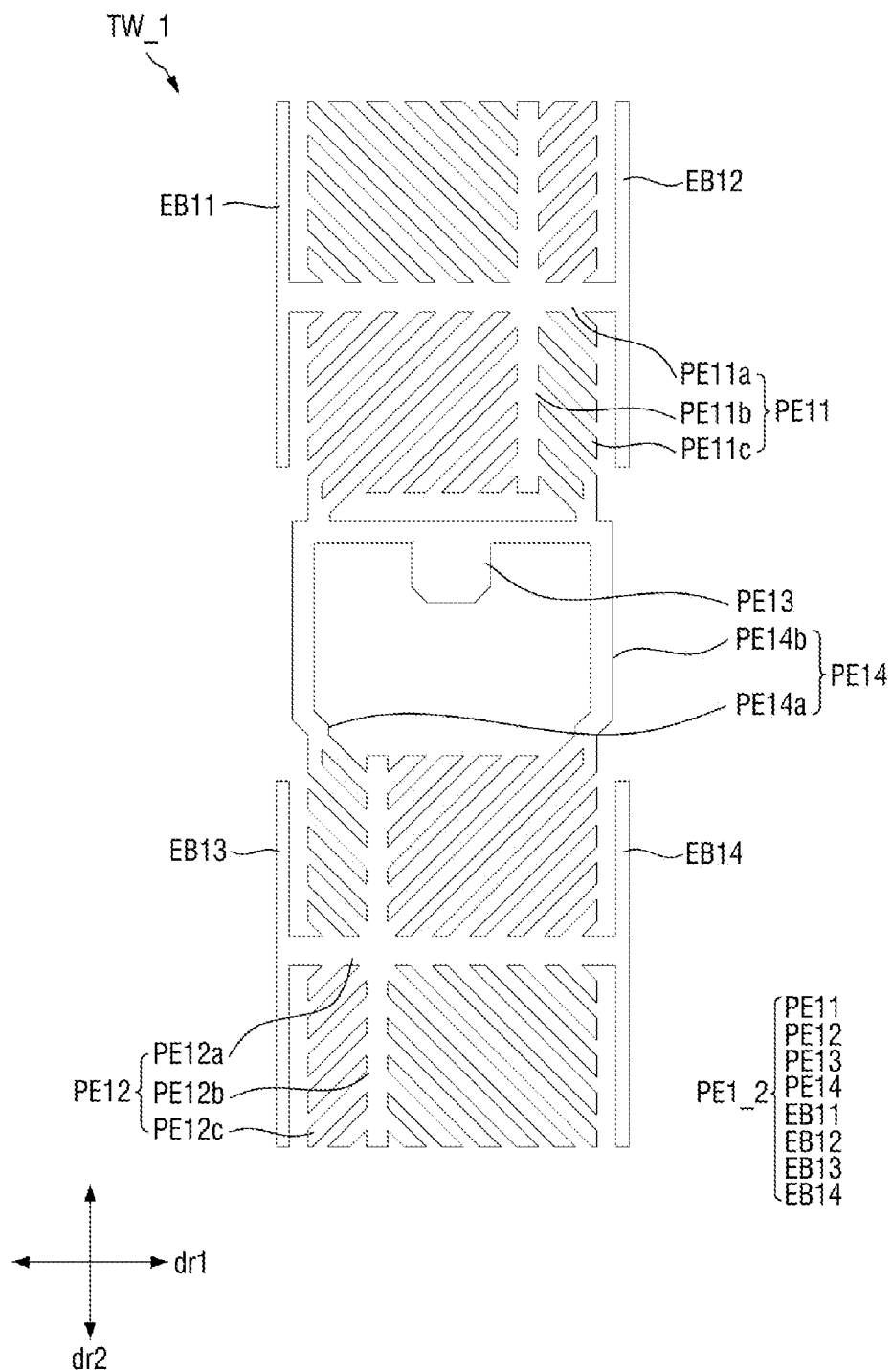
FIG. 30 is a view showing a transparent conductor included in the first pixel unit shown in FIG. 26.
Figure 31:
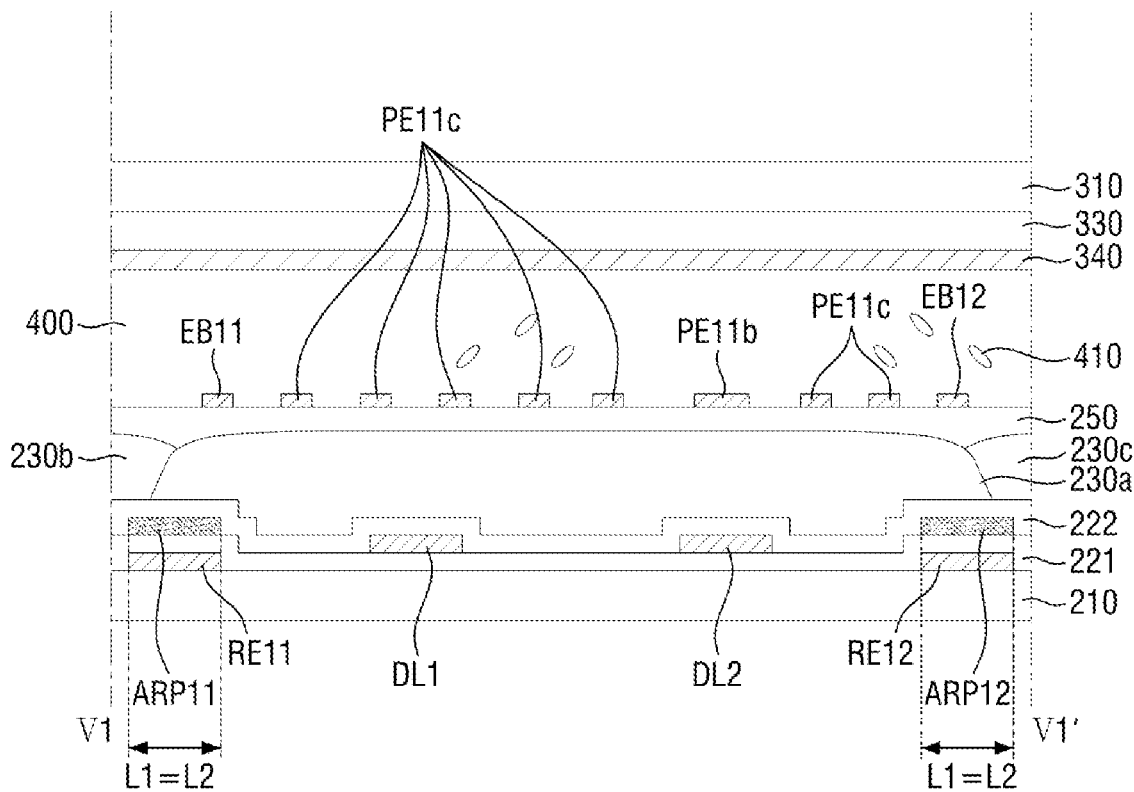
FIG. 31 is a cross-sectional view of a liquid crystal display device taken along the line V1-V1' of FIG. 26.
Figure 32:
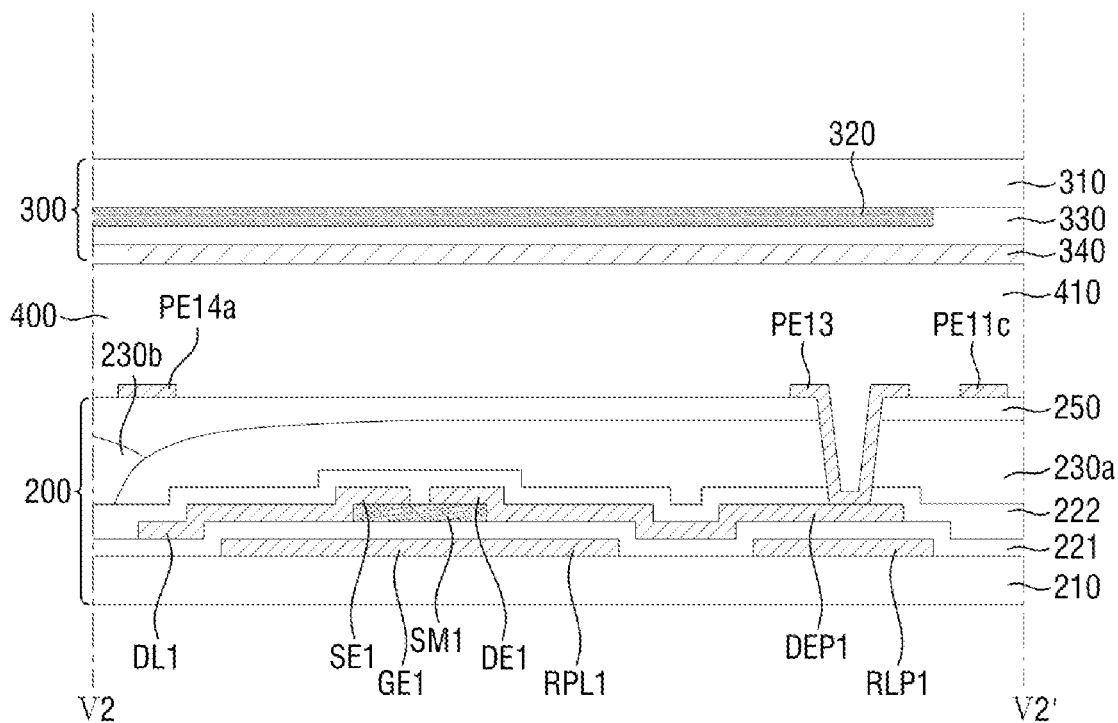
FIG. 32 is a cross-sectional view of a liquid crystal display device taken along the line V2-V2' of FIG. 26.

FIG. 25 is a layout view of first to fourth pixel units of a liquid crystal display device according to still another embodiment. FIG. 26 is a detailed view of the first pixel unit of FIG. 25. FIG. 27 is a view showing a gate conductor included in the first pixel unit shown in FIG. 26. FIG. 28 is a view showing a first semiconductor layer included in the first pixel unit shown in FIG. 26. FIG. 29 is a view showing a data conductor included in the first pixel unit shown in FIG. 26. FIG. 30 is a view showing a transparent conductor included in the first pixel unit shown in FIG. 26. FIG. 31 is a cross-sectional view of a liquid crystal display device taken along the line V1-V1' of FIG. 26. FIG. 32 is a cross-sectional view of a liquid crystal display device taken along the line V2-V2' of FIG. 26. In order to clarify the arrangement relationship between components, in FIG. 28, the gate conductor GW_1 is indicated by a dotted line, and the first semiconductor layer AW1_1 is indicated by a solid line.

Referring to FIGS. 25 to 32, a liquid crystal display device according to the present embodiment is different from the liquid crystal display device according to the embodiment of FIGS. 3 to 10 in that one pixel electrode (for example, PE1_2) is divided into two sub-pixel electrodes (for example, PE11 and PE12), and a gate line (for example, GL1) is disposed between the two sub-pixel electrodes PE11 and PE12.

Hereinafter, a description will be made with reference to a first pixel unit PX1_4.

The first pixel electrode PE1_2 may include a first sub-pixel electrode PE11 disposed at the other side in the second direction dr2 with respect to the first gate line GL1, a second sub-pixel electrode PE12 disposed at one side in the second direction dr2 with respect to the first gate line GL1, and a first sub-pixel connection electrode PE14a and a second sub-pixel connection electrode PE14b for connecting the first sub-pixel electrode PE11 and the second sub-pixel electrode PE12.

The first sub-pixel electrode PE11 and the second sub-pixel electrode PE12 may include first stem electrodes PE11a and PE12a, second stem electrodes PE11b and PE12b, and first branch electrodes PE11c and PE12c, respectively.

The second stem electrode PE11b of the first sub-pixel electrode PE11 may be disposed to overlap the second data line DL2, and the second stem electrode PE12b of the second sub-pixel electrode PE12 may be disposed to overlap the first data line DL1. Thus, the aperture ratio of each pixel unit may increase.

A first edge electrode EB11 and a second edge electrode EB12, extending in a second direction dr2, may be respectively connected to both ends of the first stem electrode PE11a of the first sub-pixel electrode PE11. A third edge electrode EB13 and a fourth edge electrode EB14, extending in the second direction dr2, may be respectively connected to both ends of the first stem electrode PE12a of the second sub-pixel electrode PE12. Each edge electrode may reduce a liquid crystal alignment interference that may occur between the adjacent pixel electrodes in the first direction dr1.

The first sub-pixel connection electrode PE14a and the second sub-pixel connection electrode PE14b may extend substantially in the second direction dr2. A first drain electrode connection DEP1 may be disposed between the first sub-pixel connection electrode PE14a and the second sub-pixel connection electrode PE14b. In an embodiment, the first drain electrode connection DEP1 may be branched from the first sub-pixel connection electrode PE14a.

Each of the first storage line RL1, the first repair line RPL1, and the first gate line GL1 may extend in the first direction dr1, and may cross the first sub-pixel connection electrode PE14a and the second sub-pixel connection electrode PE14b. The first pixel electrode PE1_2 may include two sub-pixel electrodes PE11 and PE12, and a wiring may be disposed between the sub-pixel electrodes PE11 and PE12, thereby increasing the aperture ratio of the liquid crystal display device.

Also, first to fourth storage antireflective patterns ARP11, ARP12, ARP21, and ARP22 may be arranged in the first pixel unit PX1_4. The storage electrode patterns RE11, RE12, RE21, and RE22 arranged in the first sub-pixel electrode PE11 and the second sub-pixel electrode PE12 may constitute different storage lines, respectively. For example, the first storage electrode pattern RE11 and the second storage electrode pattern RE12, overlapping the first branch electrode PE11c of the first sub-pixel electrode PE11, may constitute a first storage line RL1. The third storage electrode pattern RE21 and the fourth storage electrode pattern RE22, overlapping the first branch electrodes PE12c of the second sub-pixel electrode PE12, may constitute a second storage line RL2.

The first storage antireflective pattern ARP11 and the second storage antireflective pattern ARP12 may be disposed to overlap the first storage electrode pattern RE11 and the second storage electrode pattern RE12, respectively. The third storage antireflective pattern ARP21 and the fourth storage antireflective pattern ARP22 may be disposed to overlap the third storage electrode pattern RE21 and the fourth storage electrode pattern RE22, respectively. Thus, reflected light emitted from the gate conductor GW_1 may be reduced.

Unlike FIG. 4, although it is shown in the FIG. 26 that gate antireflective patterns (for example, ARP101 to ARP108) are omitted, the present invention is not limited thereto. In another embodiment, there may also be provided gate antireflective patterns ARP101 to ARP108 disposed to overlap a region where each of the data lines DL1 and DL2 crosses the gate conductor GW_1.

As described above, the display device according to the embodiments has high resolution, and can reduce or minimize external light reflectance while performing high-frequency driving.

The effects of the present invention are not limited by the foregoing, and other various effects are anticipated herein.

The use of "may" when describing embodiments of the inventive concept refers to "one or more embodiments of the inventive concept".

As used herein, the term "substantially" and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The display device and/or any other relevant devices or components according to embodiments of the present invention described herein may be implemented utilizing any suitable hardware, firmware (e.g., an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims and equivalents thereof.

What is claimed is:

1. A display device, comprising:
a first conductor;
a first insulating layer covering the first conductor; and
a first semiconductor layer and a second conductor, both on the first insulating layer,
wherein the first conductor comprises a gate line, a gate electrode connected to the gate line, and a storage line separated from the gate line,
wherein the first semiconductor layer comprises a channel region overlapping the gate electrode and a first antireflective pattern overlapping the storage line,
wherein the second conductor comprises a data line, a source electrode at least partially on the channel region and connected to the data line, and a drain electrode at least partially on the channel region and separated from the source electrode,
wherein the storage line comprises:
a storage electrode pattern overlapping the first antireflective pattern; and
a storage line protrusion not overlapping the first antireflective pattern, and wherein the storage line protrusion overlaps the drain electrode.

2. The display device of claim 1, further comprising:
a second insulating layer on the first semiconductor layer and the second conductor; and
a third conductor on the second insulating layer,
wherein the third conductor comprises a pixel electrode, and the pixel electrode is connected to the drain electrode through a contact hole penetrating the second insulating layer.

3. The display device of claim 2,
wherein the first antireflective pattern overlaps a part of the pixel electrode.

4. The display device of claim 2,
wherein the gate line crosses the pixel electrode.

5. The display device of claim 1,
wherein the first semiconductor layer further comprises a second antireflective pattern overlapping the gate line.

6. The display device of claim 5,
wherein the second antireflective pattern overlaps the data line.

7. The display device of claim 1, further comprising:
a second semiconductor layer on the second conductor,
wherein the second semiconductor layer comprises a third antireflective pattern overlapping the data line.

8. The display device of claim 7,
wherein a width of the third antireflective pattern is within a range of ±2 μm with respect to a width of the data line.

9. The display device of claim 7, further comprising:
a third insulating layer between the second conductor and the second semiconductor layer.

10. The display device of claim 1,
wherein the storage electrode pattern has a width of 9 μm to 13.5 μm.

11. The display device of claim 1,
wherein a width of the first antireflective pattern is within a range of ±2 μm with respect to a width of the storage electrode pattern.

12. The display device of claim 1,
wherein the first antireflective pattern has a thickness of 700 Å to 1000 Å.

13. The display device of claim 1,
wherein the first conductor further comprises a repair line connected to the gate electrode.

14. The display device of claim 13,
wherein the first semiconductor layer further comprises a fourth antireflective pattern overlapping the repair line.

15. The display device of claim 14,
wherein the fourth antireflective pattern overlaps the data line.

16. A display device, comprising:
a base substrate;
a first gate line and a second gate line, both on the base substrate, extending in a first direction, and spaced apart from each other in a second direction crossing the first direction;
a first data line and a second data line, both insulated from the first gate line and the second gate line, extending in the second direction, and spaced apart from each other in the first direction;
a first switching element comprising a first gate electrode connected to the first gate line, a first electrode connected to the first data line, and a second electrode;
a second switching element comprising a second gate electrode connected to the second gate line, a third electrode connected to the second data line, and a fourth electrode;
a first pixel electrode connected to the second electrode of the first switching element;
a second pixel electrode connected to the fourth electrode of the second switching element;
a first storage line and a second storage line, both separated from the first gate line and the second gate line; and
a first antireflective pattern overlapping the first storage line,
wherein the first gate line and the second gate line are electrically connected to each other,
wherein the first antireflective pattern comprises a semiconductor material, wherein the first storage line comprises:
  a storage electrode pattern overlapping the first antireflective pattern; and
  a storage line protrusion not overlapping the first antireflective pattern, and
wherein the storage line protrusion overlaps the second electrode of the first switching element.

17. The display device of claim 16,
wherein the first pixel electrode is adjacent to the second pixel electrode in the second direction.

18. The display device of claim 17, further comprising:
color filters of the same color, overlapping the first pixel electrode and the second pixel electrode.

19. The display device of claim 16,
wherein the first storage line overlaps at least a part of the first pixel electrode, and the second storage line overlaps at least a part of the second pixel electrode.

20. The display device of claim 16,
wherein the first data line and the second data line cross the first pixel electrode and the second pixel electrode.

21. The display device of claim 16,
wherein the first gate line crosses the first pixel electrode, and the second gate line crosses the second pixel electrode.

22. The display device of claim 16,
wherein the first gate line, the second gate line, the first storage line, and the second storage line are arranged on the same layer.

23. The display device of claim 16, further comprising:
a black matrix between the first pixel electrode and the second pixel electrode.

24. The display device of claim 16,
wherein the display device has a resolution of 8 K or more.

* * * * *